US010306256B2

(12) United States Patent
Laroche

(10) Patent No.: US 10,306,256 B2
(45) Date of Patent: May 28, 2019

(54) METHOD AND DEVICE FOR ENCODING A SEQUENCE OF IMAGES AND METHOD AND DEVICE FOR DECODING A SEQUENCE OF IMAGES

(75) Inventor: Guillaume Laroche, Melesse (FR)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 14/238,821

(22) PCT Filed: Aug. 16, 2012

(86) PCT No.: PCT/EP2012/003490
§ 371 (c)(1),
(2), (4) Date: Jun. 10, 2014

(87) PCT Pub. No.: WO2013/023785
PCT Pub. Date: Feb. 21, 2013

(65) Prior Publication Data
US 2014/0321544 A1 Oct. 30, 2014

(30) Foreign Application Priority Data

Aug. 17, 2011 (GB) .................................. 1114184.3

(51) Int. Cl.
H04N 19/107 (2014.01)
H04N 19/52 (2014.01)
(Continued)

(52) U.S. Cl.
CPC .......... *H04N 19/52* (2014.11); *H04N 19/107* (2014.11); *H04N 19/43* (2014.11); *H04N 19/436* (2014.11);
(Continued)

(58) Field of Classification Search
CPC .. H04N 19/0003; H04N 19/52; H04N 19/503; H04N 19/436; H04N 19/107; H04N 19/44; H04N 19/43; H04N 19/593
(Continued)

(56) References Cited

U.S. PATENT DOCUMENTS 6,122,320 A * 9/2000 Bellifemine ..... G01B 31/31853
375/240
7,450,642 B2 11/2008 Youn
(Continued)

FOREIGN PATENT DOCUMENTS

CN 1471320 A 1/2004
CN 1832575 A 9/2006
(Continued)

OTHER PUBLICATIONS

Ken McCann et al., IIM3: High Efficiency Video Coding (HEVC) Test Model 3 Encoder Description, Joint Collaborative Team on Video Coding (JCT-VC) of ITU-T SG16 WP3 and ISO/IEC JTC1/SC29/WG11, 5th Meeting Geneva, CH Mar. 16-23, 2011, International Telecommunication Union, Geneva, CH, 2011.
(Continued)

Primary Examiner — Zhihan Zhou
(74) Attorney, Agent, or Firm — Canon U.S.A., Inc. IP Division

(57) ABSTRACT

A method and device for deriving at least one motion information predictor for encoding of an image portion by motion compensation. At least two distinct first and second subsets of motion information predictors of a first set of motion information predictors are provided. Processing of the first subset of motion information predictors and processing of the second subset of motion information predictors is performed to obtain a final set of motion information predictors usable for predicting said image portion from the
(Continued)

reference image portion. Processing of the second subset may comprise removing duplicates from among the motion information predictors of said second subset, and may be performed so as to exclude temporal predictors. At least part of the processing of the second subset of motion information predictors may be performed concurrently with at least part of the processing of the first subset of motion information predictors.

43 Claims, 12 Drawing Sheets

(51) Int. Cl.
| | | |
|---|---|---|
| *H04N 19/503* | (2014.01) | |
| *H04N 19/593* | (2014.01) | |
| *H04N 19/44* | (2014.01) | |
| *H04N 19/43* | (2014.01) | |
| *H04N 19/436* | (2014.01) | |

(52) U.S. Cl.
CPC ........... *H04N 19/44* (2014.11); *H04N 19/503* (2014.11); *H04N 19/593* (2014.11)

(58) Field of Classification Search
USPC .................................................... 375/240.13
See application file for complete search history.

(56) References Cited

U.S. PATENT DOCUMENTS

| | | | |
|---|---|---|---|
| 8,000,392 B1 | 8/2011 | Krupiczka | |
| 2009/0129472 A1* | 5/2009 | Panusopone | H04N 19/56 375/240.16 |
| 2009/0304084 A1* | 12/2009 | Hallapuro | H04N 19/52 375/240.16 |
| 2009/0316786 A1* | 12/2009 | Bosma | H04N 19/56 375/240.16 |
| 2010/0290530 A1* | 11/2010 | Huang | H04N 19/139 375/240.16 |
| 2012/0128060 A1* | 5/2012 | Lin | H04N 19/00696 375/240.02 |
| 2012/0195368 A1* | 8/2012 | Chien | H04N 19/52 375/240.02 |
| 2012/0213288 A1* | 8/2012 | Kitaura | H04N 19/56 375/240.16 |
| 2012/0320968 A1* | 12/2012 | Zheng | H04N 19/40 375/240.02 |
| 2013/0114720 A1* | 5/2013 | Wang | H04N 19/00684 375/240.16 |
| 2013/0287112 A1 | 10/2013 | Gisquet | |

FOREIGN PATENT DOCUMENTS

| | | |
|---|---|---|
| CN | 101605262 A | 12/2009 |
| EP | 0919099 B1 | 11/2001 |
| JP | 2014-509480 A | 4/2014 |
| RU | 2310231 C2 | 11/2007 |
| WO | 98/42137 A1 | 9/1998 |
| WO | 2009/115901 A2 | 9/2009 |
| WO | 2010/137086 A1 | 12/2010 |
| WO | 2011/041321 A1 | 4/2011 |
| WO | 2012/102927 A1 | 8/2012 |

OTHER PUBLICATIONS

Nexis M. Tourapis, Feng Wu, Shipeng Li, Motion Vector Prediction with Reference Frame Consideration, Proceedings of SPIE, 2003, pp. 440-447, vol. 5203, Applications of Digital Image Processing XXVI, SPIE, Bellingham, WA, 2003.

J. Jung, G. Clare, Proposition for Robust Parsing with Temporal Predictor, Joint Collaborative Team on Video Coding (JCT-VC) of ITU-T SG16 WP3 and ISO/IEC JCT1/SC29/WG11, 4th Meeting: Daegu, KR, Jan. 20-28, 2011, Document JCTVC-D197, pp. 1-5, 2011.

Guillame Laroche, Christophe Gisquet, Patrice Onno, Edouard Francois, Nael Ouedraogo, Julien Ricard, Robust Solution for the AMVP Parsing Issue, Joint Collaborative Team on Video Coding (JCT-VC) of ITU-T SG16 WP3 and ISO/IEC JCT1/SC29/WG11, 5th Meeting: Geneva, CH, Mar. 16-23, 2011, Document JCTVC-E219, pp. 1-10, 2011.

Thomas Wiegand, Woo-Jin Han, Benjamin Bross, Jens-Rainer Ohm, Gary J. Sullivan, WD3:Working Draft 3 of High-Efficiency Video Coding, Joint Collaborative Team on Video Coding (JCT-VC) of ITU-T SG16 WP3 and ISO/IEC JCT1/SC29/WG11, 5th Meeting: Geneva, CH, Mar. 16-23, 2011, Document JCTVC-E603, pp. i, 118-124, 2011.

Minhua Zhou, Vivienne Sze, Yasutomo Matsuba, A Study on HM3.0 Parsing Throughput Issue, Joint Collaborative Team on Video Coding (JCT-VC) of ITU-T SG16 WP3 and ISO/IEC JTC1/SC29/WG11 6th Meeting:Torino, IT Jul. 14-22, 2011, Document JCTVC-F068, pp. 1-11, 2011.

Toshiyasu Sugio, Takahiro Nishi, Parsing Robustness for Merge/AMVP, Joint Collaborative Team on Video Coding (JCT-VC) of ITU-T SG16 WP3 and ISO/IEC JTC1/SC29/WG11 6th Meeting:Torino, IT, Jul. 14-22, 2011, Document JCTVC-F470, pp. 1-9, 2011.

Minhua Zhou; CE9: Simplified AMVP design (SP06S1, SP06S2); Texas Instruments Inc.; Jun. 30, 2011; pp. 1-12.

Yeping Su, et al.; On motion vector competition; Joint Collaborative Team on Video Coding(JCT-VC) of ITU-T SG16 WP3 and ISO/IEC JTC1/SC29/WG11, 3rd Meeting, JCTVC-C257; pp. 1-4.

Minhua Zhou; Evaluation results on merge mode in HM2.0; Joint Collaborative Team on Video Coding (JCT-VC) if ITU-T SG16 wp3 and ISO/IEC JTC1/SC29/WG11, 5th Meeting; Geneva CH Mar. 2011; pp. 1-7.

Jian-Liang Lin; Improved Advanced Motion Vector Prediction; Joint Collaborative Team on Video Coding (JCT-VT) of ITU-T SG16 WP3 and ISO/IEC/JTC1/SC29/WG11; 4th meeting; Daegu, KR Jan. 20-28, 2011; pp. 1-8.

* cited by examiner

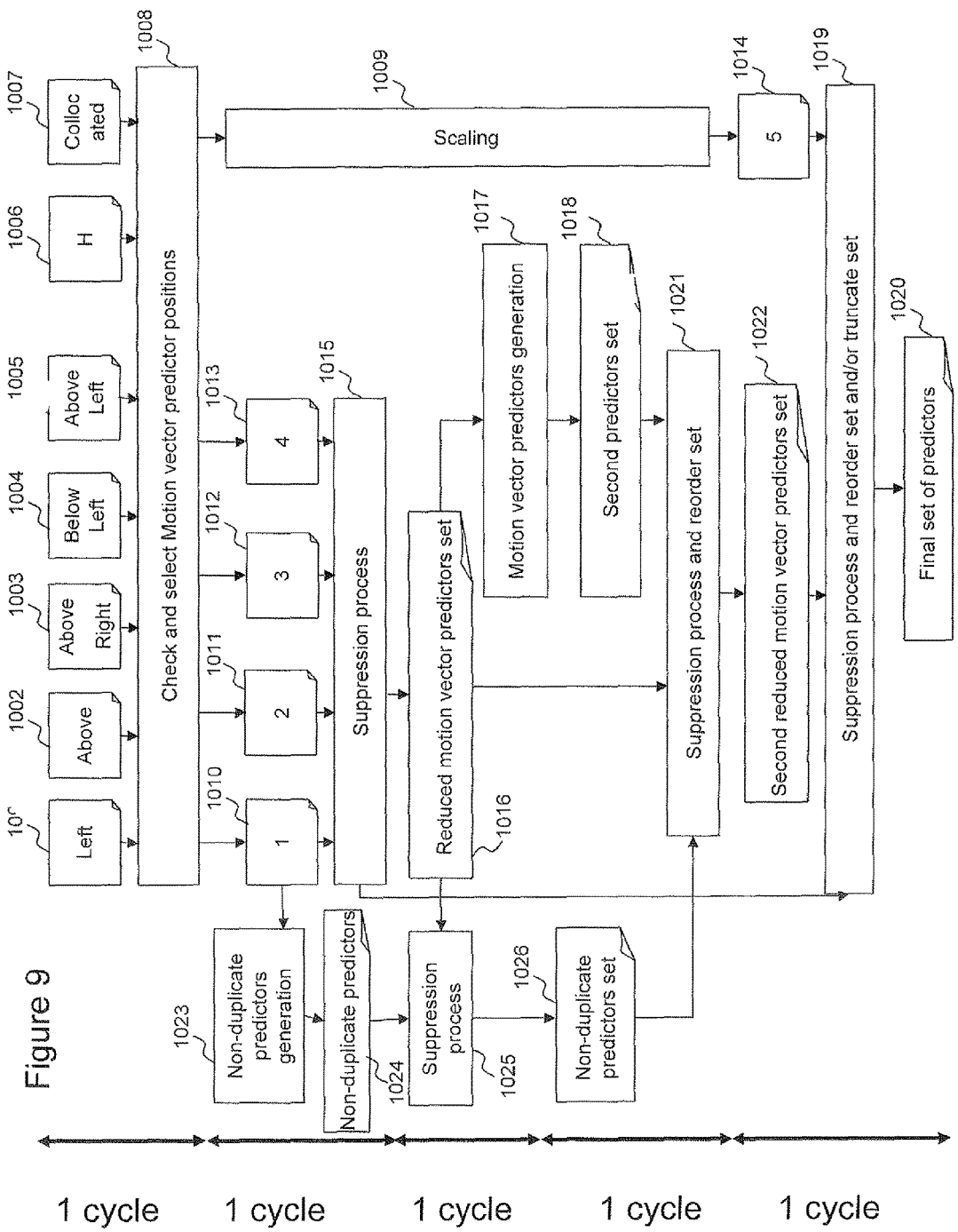

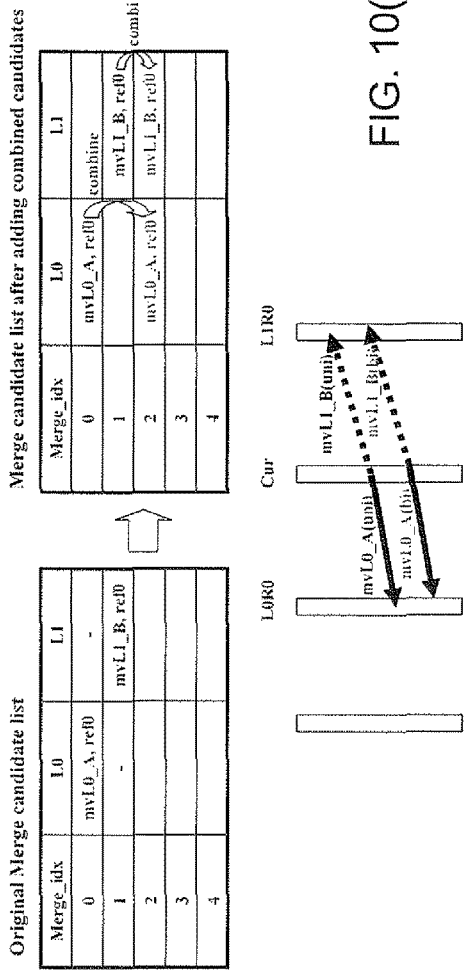
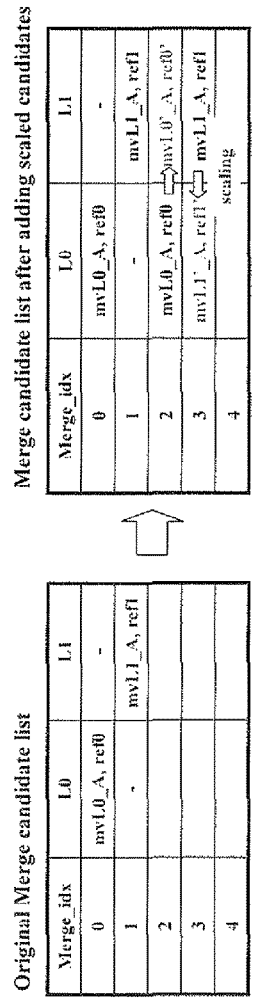
FIG. 10(a)
FIG. 10(b)

FIG. 10(c)

METHOD AND DEVICE FOR ENCODING A SEQUENCE OF IMAGES AND METHOD AND DEVICE FOR DECODING A SEQUENCE OF IMAGES

CROSS-REFERENCE TO RELATED APPLICATIONS

The application is the National Phase application of PCT Application No. PCT/EP2012/003490, filed on Aug. 16, 2012 and titled "Method and Device for Encoding a Sequence of Images and Method and Device for Decoding a Sequence of Images". This application claims the benefit under 35 U.S.C. § 119(a)-(d) of United Kingdom Patent Application No. 1114184.3, filed on Aug. 17, 2011 and titled "Method and Device for Encoding a Sequence of Images and Method and Device for Decoding a Sequence of Images". The above cited patent applications are incorporated herein by reference in their entirety.

The present invention concerns a method and device for encoding a sequence of digital images and a method and device for decoding a corresponding bitstream. The invention further relates to a method and device for deriving motion information, including at least one motion information predictor for predicting an image portion of an image predicted by motion compensation with respect to at least one reference image portion.

The invention may be applied in the field of digital signal processing, and in particular in the field of video compression using motion compensation to reduce spatial and temporal redundancies in video streams.

Many video compression formats, such as for example H.263, H.264, MPEG-1, MPEG-2, MPEG-4, SVC, use block-based discrete cosine transform (DCT) and motion compensation to remove spatial and temporal redundancies. They can be referred to as predictive video formats. Each frame or image of the video signal is divided into slices which are encoded and can be decoded independently. A slice is typically a rectangular portion of the frame, or more generally, a portion of a frame or an entire frame. Further, each slice is divided into macroblocks (MBs), and each macroblock is further divided into blocks, typically blocks of 8×8 pixels. The encoded frames are of two types: temporal predicted frames (either predicted from one reference frame called P-frames or predicted from two reference frames called B-frames) and non temporal predicted frames (called Intra frames or I-frames).

Temporal prediction consists in finding in a reference frame, either a previous or a future frame of the video sequence, an image portion or reference area which is the closest to the block to encode. This step is typically known as motion estimation. Next, the block is predicted using the reference area in a step typically referred to as motion compensation—the difference between the block to encode and the reference portion is encoded, along with an item of motion information relative to the motion vector which indicates the reference area to use for motion compensation. In INTRA prediction, a prediction direction is encoded.

In order to further reduce the cost of encoding motion information, a motion vector may be encoded in terms of a difference between the motion vector and a motion vector predictor, typically computed from one or more motion vectors of the blocks surrounding the block to encode.

In H.264, motion vectors are encoded with respect to a median predictor computed from the motion vectors situated in a causal neighbourhood of the block to encode, for example from the blocks situated above and to the left of the block to encode. The difference, also referred to as a residual motion vector, between the median predictor and the current block motion vector is encoded to reduce the encoding cost.

Encoding using residual motion vectors saves some bitrate, but necessitates that the decoder performs the same computation of the motion vector predictor in order to decode the value of the motion vector of a block to decode.

Recently, further improvements in coding efficiency have been proposed, such as using a plurality of possible motion vector predictors. This method, often referred to as motion vector competition (MVCOMP), consists in determining from among several motion vector predictors or candidates which motion vector predictor minimizes the encoding cost, typically a rate-distortion cost, of the residual motion information. The residual motion information comprises the residual motion vector, i.e. the difference between the actual motion vector of the block to encode and the selected motion vector predictor, and an item of information indicating the selected motion vector predictor, such as for example an encoded value of the index of the selected motion vector predictor. The index of the selected motion vector predictor is coded in the bitstream with a unary max code based on a fixed list size.

In High Efficiency Video Coding (HEVC), a new implementation of the same concept for enabling the selection of the best predictor, from a given set of predictors composed of spatial motion vectors and temporal motion vectors, has been proposed. This technique is referred to as Advanced Motion Vector Prediction (AMVP). If some predictors from among these predictors of the given set are duplicates of other predictors in the set, the duplicates can be removed and further predictors can be added to the set to create a new second set of predictors. The added predictors can be a combination of the spatial and temporal predictors already in the set, other predictors derived form these spatial and temporal predictors, or predictors with fixed values. Finally, the duplicate predictors of the second set of predictors are removed in order to obtain non-redundant candidates in the second set of predictors.

The generated second set of predictors significantly increases the computational complexity of the derivation process. The increased computational complexity results from the cascade predictors generation.

The current HEVC implementation uses a set of motion vector predictors containing at most 2 predictors for the Inter mode and at most 5 predictors for the Merge Skip mode and the Merge mode.

In the current HEVC design, Inter prediction can be unidirectional or bi-directional. Uni-directional refers to one predictor block being used to predict the current block. The one predictor block is defined by a list index, a reference frame index and a motion vector. The list index corresponds to a list of reference frames. It may be considered, for example, that two lists are used: L0 and L1. One list contains at least one reference frame and a reference frame can be included in both lists. A motion vector has two components: horizontal and vertical. The motion vector corresponds to the spatial displacement in term of pixels between the current block and the temporal predictor block in the reference frame. Thus, the block predictor for the uni-directional prediction is the block from the reference frame (ref index) of the list, pointed to by the motion vector.

For Bi-directional Inter prediction two block predictors are considered. One for each list (L0 and L1). Consequently, 2 reference frame indexes are considered as well as 2 motion vectors. The Inter block predictor for bi-prediction is the average, pixel by pixel, of the two blocks pointed to by these two motion vectors.

The motion information dedicated to the Inter block predictor can be defined by the following parameters:

Direction type: uni or bi

One list (uni-direction) or two lists (bi-direction): L0, L1, L0 and L1.

One (uni-direction) or two reference frame indexes (bi-direction): RefL0, RefL1, (RefL0, RefL1).

One (uni-direction) or two (bi-direction) motion vectors: each motion vector has two components (horizontal mvx and vertical mvy).

It may be noted that the bi-directional Inter predictor may only be used for a B type slice type. Inter prediction in B slices can be uni or bi-directional. In P slices, the Inter prediction is only uni-directional.

The current design of HEVC uses 3 different Inter modes: an Inter mode, a Merge mode and a Merge Skip mode. The main difference between these modes is the data signaling in the bitstream.

In the Inter mode all data are explicitly signaled. This means that the texture residual is coded and inserted into the bitstream (the texture residual is the difference between the current block and the Inter prediction block). For the motion information, all data are coded. Thus, the direction type is coded (uni or bi-directional). The list index, if needed, is also coded and inserted into the bitstream. The related reference frame indexes are explicitly coded and inserted into the bitstream. The motion vector value is predicted by the selected motion vector predictor. The motion vector residual for each component is then coded and inserted into the bitstream followed by the predictor index.

In the Merge mode, the texture residual and the predictor index are coded and inserted into the bitstream. A motion vector residual, direction type, list or reference frame index are not coded. These motion parameters are derived from the predictor index. Thus, the predictor is the predictor of all data of the motion information.

In the Merge Skip mode no information is transmitted to the decoder side except for the "mode" and the predictor index. In this mode the processing is similar to the Merge mode except that no texture residual is coded or transmitted. The pixel values of a Merge Skip block are the pixel values of the block predictor.

In the set of motion information predictors represented in FIG. 1, two spatial motion vectors of the Inter mode are chosen from among those blocks, in Frame N, which are above and to the left of the block to be encoded, including the above corner blocks and left corner block.

The left predictor is selected from among the blocks "Below Left" and "Left". The following conditions are evaluated in the specified order until a motion vector value is found:

1. The motion vector from the same reference list and the same reference picture
2. The motion vector from the other reference list and the same reference picture
3. The scaled motion vector from the same reference list and a different reference picture
4. The scaled motion vector from the other reference list and a different reference picture If no value is found, the left predictor is considered as being unavailable. In this case, it indicates that the related blocks were Intra coded or those blocks do not exist. The above predictor is selected from among "Above Right", "Above" and "Above left" in this specific order, with the same conditions as described above.

The temporal motion predictor comes from the nearest reference frame in low delay configuration. In the case of B frames, 2 motion vectors are considered for the collocated block in frame N−1. One is in the first list "L0" and one is in the second list "L1". If both motion vectors exist, the motion vector which has the shortest temporal distance is selected. If both motion vector predictors have the same temporal distance, the motion from the first list "L0" is selected. The collocated motion vector selected is then scaled, if needed, according to its temporal distance and to the temporal distance of the encoded motion vector. If no collocated predictor exists, the predictor is considered as unavailable.

For hierarchical B frames coding, 2 collocated motion vectors can be considered. Both come from the future reference frame. The motion vector which crosses the current frame is selected. If both predictors cross the current frame, the motion vector which has the shortest temporal distance is selected. If both predictors have the same temporal distance, the motion from the first list "L0" is then selected. The collocated motion vector selected is then scaled, if needed, according to its temporal distance and to the temporal distance of the encoded motion vector. If no collocated predictor exists, the predictor is considered as unavailable.

For the low delay case and hierarchical case, when the collocated block is divided into a plurality of partitions (potentially, the collocated block contains a plurality of motion vectors), the partition selected is the top left center partition. Moreover, the temporal predictor is the motion vector of the block at the bottom right position of the collocated block (position H in FIG. 1). If this block does not exist or if it is Intra coded, the block at the center position of the collocated block is selected as the motion vector which will be derived.

The motion predictor value is then added to the set of predictors.

Finally, the suppression process is applied. This consists in removing duplicate predictors from the set of selected motion vector predictors. At the end of this process, the set contains non-duplicate motion vector predictors. This set can contain 1, 2, 3 or 4 predictors. In the current design, the list of predictors is fixed in order to limit the list size to 2. Consequently, the selected predictor is coded with one bit. Thus, if the number of predictors in the list is 3 or 4, the last predictor or respectively the 2 last predictors are removed.

A predictor of merge modes ("classical" or Skip) represents all the motion information: direction, list, reference frame index and motion vectors. The predictor index is coded with a unary max code as depicted in Table 1.

TABLE 1

| | Codeword when the amount of predictors in the set is N | | | | |
|---|---|---|---|---|---|
| Index | N = 1 | N = 2 | N = 3 | N = 4 | N = 5 |
| 0 | (inferred) | 0 | 0 | 0 | 0 |
| 1 | | 1 | 10 | 10 | 10 |
| 2 | | | 11 | 110 | 110 |
| 3 | | | | 111 | 1110 |
| 4 | | | | | 1111 |

The list size is fixed to 5 for all Merge blocks or Merge Skip blocks in the current HEVC design.

FIG. 2 is a flow chart of an example of a motion vector derivation process for Merge Modes of Interprediction (Merge Skip and Merge have the same motion vector predictor derivation process). The method is applied to obtain a set of potential motion information predictors for encoding of an image portion of an image with respect to a reference image portion. In the first step of the derivation, 7 block positions are considered (601 to 607). These positions are the spatial and temporal positions depicted in FIG. 1 (each position is labeled the same is both figures). Module 608 checks the availability of these motion vectors and selects at most 5 motion vectors. This module implementing step 608 determines that a predictor is available if it exists and if the block is not Intra coded. The selection and the verification of the 5 selected motion vectors is executed in accordance with the following conditions:

- If the "Left" motion vector (601) is available (i.e. if it exists and if this block is not Intra coded), the motion vector of the "Left" block is selected and used as the predictor 1 (610).
- If the "Above" motion vector (602) is available, the motion vector of the "Above" block is selected and used as the predictor 2 (611).
- If the "Above Right" motion vector (603) is available, the motion vector of the "Above Right" block is selected and used as the predictor 3 (612).
- If the "Below Left" motion vector (604) is available, the motion vector of the "Below Left" block is selected and used as the predictor 4 (613).
- If one (or more) of the preceding predictors is not available and if the "Above Left" motion vector (605) is available, the motion vector of the "Above Left" block is added to the set of motion vector predictors after the added spatial predictor.
- If the "H" motion vector is available, the motion vector of the "H" block is selected and used as the predictor 5(614). If the "H" block is not available, the availability of the "collocated" motion vector (i.e. the motion vector of the block at the same position in the reference frame as the current block in the current frame) is checked and, if it exists, it is used as the temporal predictor. The availability check performed by the module 608 requires 1 cycle.

The temporal predictor should be scaled if needed. Indeed, for the temporal motion vector, the direction and the reference frame index do not depend on the H or collocated block but on the data of the current slice. If the current block is in a B slice, the temporal predictor is always bidirectional and always unidirectional for P slices. The reference frame indexes for each list of reference frames (L0, L1) are derived from the Left and the Above predictor. If, for a list, both the Left and Above blocks have no reference frame index, the reference frame index for the temporal predictor is set to zero.

Since the reference frame index for the temporal predictor does not depend on the reference frame index of the "H" or "collocated" block but on the reference frame of the Left and Above predictor, its motion vector value should be scaled. This means that if the temporal distance covered by the temporal motion vector is different to the difference between the current frame and the reference frame of the predictor, the temporal motion vector is scaled to cover the correct temporal distance.

At the end of the modules 608 and 609, the predictor set contains at most 5 predictors (610 to 614). Next, a suppression process 615 is applied in order to remove duplicate candidates from the predictor set. This process consists in comparing each predictor of the set to all the other predictors in the same set and in removing those predictors which are equal to another predictor in the set (while keeping the other predictor of which the duplicate candidate is a duplicate in the set) so that there are no duplicates among the predictors in the set. The suppression process for P slices takes into account the values of the motion vectors and their reference frame indexes. Accordingly, the two components of a motion vector and its reference index are compared to all the others and only if these three values are equal, is the predictor removed from the set. For a B frame, this criterion is extended to the direction and the lists. Thus, a predictor is considered as a duplicate predictor if it uses the same direction, the same lists (L0, L1, or L0 and L1), the reference frame indexes and the same value of the motion vectors (MV_L0 and MV_L1 for bi prediction). The suppression process lasts 1 cycle when 5 predictors at most need to be compared. Indeed, it may be considered that 12 comparisons can be computed in 1 cycle. The number of comparisons for the suppression process in the most complex case is equal to the Sum of 0 to N−1. Consequently, for 5 predictors 10 comparisons are needed (i.e. 4+3+2+1=10).

At the end of this suppression process 615, a reduced predictors set is generated 616.

Next, a motion vector generation module 617 generates new candidates based on the reduced motion vector predictor set. This processing can typically last for at least one cycle. It may be noted that in the current HEVC design, the scheme used can produce a maximum of 20 predictors in the most complex case. This module 617 produces a second set of predictors 618.

The second set of predictors 618 is added to the reduced set of predictors 616 and the suppression process is applied to remove the duplicate candidates of this second predictor set compared to both the reduced and second sets. This suppression process is similar to the suppression process of module 615. Yet at the end, if the list contains more than 5 predictors the list of predictors is truncated to 5 which is the current list size defined in the HEVC design. It may be noted that this process can last at least 1 cycle. However the duration of the cycle depends on the number of predictors generated in the second set of predictors 618. In the current implementation of HEVC, this process lasts 3 cycles because of the amount of predictors generated (most complex case: 32 comparisons for the current design).

Finally, the suppression process 619 produces a final list of predictors 620 from where the predictor for the current block will be extracted.

A drawback of the process is that the current motion vector predictor derivation for the Merge mode can reach 11 cycles in the most complex case while at least 5 cycles are needed in the least complex case. Motion vector derivation thus has a significant impact on encoding and decoding complexity.

The present invention has been devised to address one or more of the foregoing concerns.

According to a first aspect of the invention there is provided a method of deriving at least one motion information predictor for encoding or decoding of an image portion of an image by motion compensation with respect to at least one reference image portion, wherein for said image portion to be encoded or decoded, the method comprises: providing, for processing, at least two distinct first and second subsets of motion information predictors of a first set of motion information predictors; processing the first subset of motion information predictors; and processing the second subset of motion information predictors, at least part of the processing of the second subset of motion information predictors being performed concurrently with at least part of the processing of the first subset of motion information predictors; and obtaining, based on motion information predictors resulting from the processing of the first subset of motion information predictors and the processing of the second subset of motion information predictors, a final set of motion information predictors usable for predicting said image portion from the reference image portion.

The computational complexity of the current HEVC design can thus be reduced by processing the motion vector derivation in parallel.

In embodiments of the invention a motion information predictor includes at least a motion vector predictor. In further embodiments a motion information predictor may further include motion information parameters such as index of the reference image, direction type: uni or bi, One list (uni-direction) or two lists (bi-direction): L0, L1, L0and L1. In some embodiments each motion vector predictor has two components (horizontal and vertical).

In some embodiments of the invention the first subset comprises at least one temporal motion information predictor and the second subset comprises at least one spatial motion information predictor.

In a particular embodiment of the invention a first subset of motion information predictors includes a temporal motion information predictor and processing of the first subset of the first set comprises temporally scaling the temporal motion information predictor based on the temporal difference between the image of the image portion to be encoded and image of the reference image portion.

Processing of the second subset may include generating a set of non-duplicate motion information predictors in which there are no duplicates among the motion information predictors of the said set.

In embodiments of the invention a motion information predictor may be considered to be a duplicate of another motion information predictor if the respective values of the two components of each motion vector and other association motion information parameters are equal to one another.

Processing of the second subset may include generating one or more additional motion information predictors based on the motion information predictors of the second subset. For example, generating one or more additional motion information predictors comprises combining one or more motion information predictors of the second subset, and/or adding an offset to one or more information predictors of the second subset.

By generating the additional predictors based only on predictors which do not need scaling operations complexity is reduced and the scaling process may be operated in parallel to the new generation of predictors. The number of cycles needed for the derivation motion vectors of Merge modes can be reduced and the number of comparisons needed for the Merge modes motion vector to provide a set of non-duplicate predictors is also reduced.

In an embodiment, processing of the second subset of the first set of motion information predictors comprises removing duplicates from among the motion information predictors of said second subset, in the case where the second subset contains one or more motion information predictors which are the same, to provide a reduced subset of motion information predictors; and generating further motion information predictors based on the reduced subset of motion information predictors to provide a further second subset of motion information predictors.

There may be provided, independently, in a related aspect of the invention, a method of deriving at least one motion information predictor for encoding or decoding of an image portion of an image by motion compensation with respect to at least one reference image portion, wherein for said image portion to be encoded or decoded, the method comprises providing, for processing, at least two distinct first and second subsets of motion information predictors of a first set of motion information predictors (801-807), the first subset comprising at least one temporal motion information predictor, and the second subset comprising at least one spatial motion information predictor and excluding any temporal motion information predictor; processing (808, 809) the first subset of motion information predictors; and processing (808, 815, 817) the second subset of motion information predictors; and obtaining (819), based on motion information predictors (818, 814) resulting from the processing of the first subset of motion information predictors and the processing of the second subset of motion information predictors, a final set (820) of motion information predictors usable for predicting said image portion from the reference image portion; wherein the processing of the second subset comprises removing duplicates from among the motion information predictors of said second subset only, in the case where the second subset contains one or more motion information predictors which are the same, to provide a reduced subset of motion information predictors (816).

Since temporal predictors are excluded from selection for the second subset, it will be understood that the process of removing or suppressing duplicates from among the selected predictors of the second subset can be applied to spatial predictors only, and in this way does not involve processing temporal motion information predictors.

By excluding temporal predictors from the suppression process in this way, the overall number of comparisons is reduced, thereby lowering computational complexity.

Conversely, in certain embodiments spatial predictors are excluded from selection for the first subset. Processing of the first set (ie the temporal motion predictors) may not involve removal of duplicates in some embodiments, although, as explained in greater detail below, embodiments may advantageously combine processed first and second subsets so as to exclude duplicates at the stage of obtaining the final set. Stated differently, processing of the first set may therefore not involve removal of duplicates prior to obtaining the final set.

In an embodiment, scaling of the temporal motion information predictor of the first subset is performed concurrently with the steps of removing duplicates and generating further motion information predictors of the second subset.

In an embodiment, the method includes: removing duplicates from among the motion information predictors resulting from the processing of the first subset of motion information predictors and the processing of the second subset of motion information predictors, in the case where one or more motion information predictors resulting from the processing of the first subset of motion information predictors and the processing of the second subset of motion information predictors are the same, to provide the final set of motion information predictors usable for encoding said image portion such that are no duplicates among the final set of motion information predictors.

In an embodiment, the processing of the second subset of motion information predictors further comprises removing duplicates from among the motion information predictors of the further second subset of motion information predictors in the case where the further second subset contains one or more motion information predictors which are the same, to provide a second reduced subset of motion information predictors.

In an embodiment, the step of removing duplicates from among the motion information predictors of the further second subset is performed concurrently with scaling of the temporal motion information predictor of the first subset.

In an embodiment the method includes adding, to the second reduced subset of motion information predictors, a motion information predictor, resulting from the processing of the first subset of motion information predictors, which is not a duplicate of any of the motion information predictors of the second reduced subset of motion information predictors to obtain the final set of motion information predictors.

In an embodiment, the method includes adding, to the reduced subset of motion information predictors, a motion information predictor resulting from the processing of the first subset of motion information predictors which is not a duplicate of any of the motion information predictors of the reduced subset of motion information predictors; and wherein the final set of motion information predictors comprises non duplicate motion vectors from among the motion vector predictors of the reduced subset of motion information predictors and the further second subset of motion information predictors.

In an embodiment, the processing of the second subset performed concurrently with the processing of the first subset is based on an estimation of the duration of the processing of the first subset.

In an embodiment, the motion information predictors resulting from the processing of the second subset which are added to the motion information predictors resulting from the processing of the first subset to obtain the final set of motion information predictors is based on the duration of the processing of the first subset.

In an embodiment, the method includes a step of determining, based on the temporal difference between the image of the image portion and the image of the reference image portion, whether or not a temporal scaling process is to be applied to the first subset of motion information predictors; and wherein in the case where it is determined that a temporal scaling process is to be applied, processing of the first subset of motion information predictors comprises a step of temporal scaling the motion information predictors of the first subset of motion information predictors based on the temporal difference between the image of the image portion and the image of the reference image portion; otherwise, in the case where it is determined that a temporal scaling process is not to be applied, processing of the first subset of motion information predictors comprises a step of removing duplicates from among the motion information predictors of the first subset of motion information predictors such that a reduced subset comprising non-duplicate motion information predictors from among the motion information predictors of the first subset of motion information predictors and the second subset of motion information predictors is provided by processing of the first subset of motion information predictors and processing of the second subset of motion information predictors.

In an embodiment, in the case where it is determined that a temporal scaling process is to be applied, the final set of predictors is obtained by removing duplicates from among the motion information predictors resulting from the concurrent processing of the first subset of motion information predictors and the second subset of motion information predictors; otherwise in the case where it is determined that a temporal scaling process is not to be applied, the final set of predictors is obtained by generating further motion information predictors, based on the reduced subset to provide a further second subset of motion information predictors and removing duplicates from among the further second subset of motion information predictors.

In an embodiment, the method includes determining the complexity of the temporally scaling process of the first subset of motion information predictors and wherein, in the case where it is determined that the temporal scaling process will last for a longer duration than a predetermined duration threshold, the final set of motion information predictors is obtained by removing duplicates from among the motion information predictors resulting from the processing of the first subset of motion information predictors and the processing of the second subset of motion information predictors; otherwise, in the case where it is determined that the temporal scaling process will last for a shorter duration than a predetermined duration threshold, the final set of predictors is obtained by adding, to the reduced subset of motion information predictors obtained from the second subset of motion vector predictors, a motion information predictor resulting from processing of the first subset of motion information predictors which is not a duplicate of any of the motion information predictors of the reduced subset of motion information predictors; wherein the final set of motion information predictors comprises non duplicate motion information predictors from among the motion information predictors of the reduced subset of motion information predictors and the further second subset of motion information predictors.

In an embodiment, processing of the second subset of the first set of motion information predictors comprises removing duplicates from among the motion information predictors of said second subset to provide a reduced subset of motion information predictors; and generating a further set of motion information predictors based on one of the motion information predictors of said second subset and including the said one of the motion information predictors of said second subset, wherein there are no duplicates among the further set of motion information predictors, the method further comprising removing duplicates from among the reduced subset of motion information predictors and the further set of motion information predictors to provide a non-duplicate set of motion information predictors.

In an embodiment, processing of the second subset of the first set of motion information predictors further comprises: generating further motion information predictors based on the reduced subset of motion information predictors to provide a further second subset of motion information predictors; and removing duplicates from among the motion information predictors of the further second subset of motion information predictors and the non-duplicate set of motion information predictors to provide a second non-duplicate set of motion information predictors.

In an embodiment, the method includes adding, to the second non-duplicate set of motion information predictors, a motion information predictor resulting from the processing of the first subset of motion information predictors which is not a duplicate of any of the motion information predictors of the second non-duplicate set of motion information predictors to obtain the final set of motion information predictors.

According to a second aspect of the invention there is provided a device for deriving at least one motion information predictor for encoding or decoding of an image portion of an image by motion compensation with respect to at least one reference image portion, the device comprising: means for obtaining, at feast two distinct first and second subsets of motion information predictors of a first set of motion information predictors; first processing means for processing the first subset of motion information predictors; and second processing means for processing the second subset of motion information predictors, wherein the second processing means is operable to perform at least part of the processing of the second subset of motion information predictors concurrently with at least part of the processing of the first subset of motion information predictors performed by the first processing means; and means for obtaining, based on motion information predictors resulting from the processing of the first subset of motion information predictors and the processing of the second subset of motion information predictors, a final set of motion information predictors usable for predicting said image portion from the reference image portion.

In an embodiment, the first subset comprises at least one temporal motion information predictor and the second subset comprises at least one spatial motion information predictor.

In an embodiment, the first processing means is operable to temporally scale the or each temporal motion information predictor based on a temporal difference between the image of the image portion to be encoded and the image of the reference image portion.

In an embodiment, the second processing means is operable to generate a set of non-duplicate motion information predictors in which there are no duplicates among the motion information predictors of the said set.

In an embodiment, the second processing means is operable to generate one or more additional motion information predictors based on the motion information predictors of the second subset.

In an embodiment, the second processing means is operable to combine one or more motion information predictors of the second subset, and/or add an offset to one or more information predictors of the second subset.

In an embodiment, the second processing means is operable to: remove duplicates from among the motion information predictors of said second subset, in the case where the second subset contains one or more motion information predictors which are the same, to provide a reduced subset of motion information predictors; and generate further motion information predictors based on the reduced subset of motion information predictors to provide a further second subset of motion information predictors.

In a related aspect, there may independently be provided a device for deriving at least one motion information predictor for encoding or decoding of an image portion of an image by motion compensation with respect to at least one reference image portion, the device comprising: means for obtaining, at least two distinct first and second subsets of motion information predictors of a first set of motion information predictors (801-807), the first subset comprising at least one temporal motion information predictor and the second subset comprising at least one spatial motion information predictor and excluding any temporal motion information predictor; first processing means (808, 809) for processing the first subset of motion information predictors; and second processing means (808, 815, 817) for processing the second subset of motion information predictors; and means for obtaining (819), based on motion information predictors (818, 814) resulting from the processing of the first subset of motion information predictors and the processing of the second subset of motion information predictors, a final set (820) of motion information predictors usable for predicting said image portion from the reference image portion; wherein the second processing is operable to remove duplicates from among the motion information predictors of said second subset only, in the case where the second subset contains one or more motion information predictors which are the same, to provide a reduced subset of motion information predictors (816).

In an embodiment, the first processing means is operable to perform scaling of the temporal motion information predictor of the first subset concurrently with the operations of removing duplicates and generating further motion information predictors of the second subset performed by the second processing means.

In an embodiment, the device includes suppression means for removing duplicates from among the motion information predictors resulting from the processing of the first subset of motion information predictors and the processing of the second subset of motion information predictors, in the case where one or more motion information predictors resulting from the processing of the first subset of motion information predictors and the processing of the second subset of motion information predictors are the same, to provide the final set of motion information predictors usable for encoding said image portion such that are no duplicates among the final set of motion information predictors.

In an embodiment, the second processing means is operable to remove duplicates from among the motion information predictors of the further second subset of motion information predictors in the case where the further second subset contains one or more motion information predictors which are the same, to provide a second reduced subset of motion information predictors.

In an embodiment, the second processing means is operable to remove duplicates from among the motion information predictors of the further second subset concurrently with scaling of the temporal motion information predictor of the first subset performed by the first processing means.

In an embodiment, the device includes means operable to add, to the second reduced subset of motion information predictors, a motion information predictor, resulting from the processing of the first subset of motion information predictors, which is not a duplicate of any of the motion information predictors of the second reduced subset of motion information predictors to obtain the final set of motion information predictors.

In an embodiment, the device includes means for adding, to the reduced subset of motion information predictors, a motion information predictor resulting from the processing of the first subset of motion information predictors which is not a duplicate of any of the motion information predictors of the reduced subset of motion information predictors; and wherein the final set of motion information predictors comprises non duplicate motion vectors from among the motion vector predictors of the reduced subset of motion information predictors and the further second subset of motion information predictors.

In an embodiment, the device includes means for estimating the duration of the processing of the first subset wherein the processing of the second subset performed by the second processing means concurrently with the processing of the first subset performed by the first processing means is based on the estimation of the duration of the processing of the first subset.

In an embodiment, the device includes means for estimating the duration of the processing of the first subset wherein the motion information predictors resulting from the processing of the second subset which are added to the motion information predictors resulting from the processing of the first subset to obtain the final set of motion information predictors is based on the duration of the processing of the first subset.

In an embodiment, the device includes means for determining, based on the temporal difference between the image of the image portion and the image of the reference image portion, whether or not a temporal scaling process is to be applied to the first subset of motion information predictors; and wherein in the case where it is determined that a temporal scaling process is to be applied, the first processing means is operable to perform temporal scaling the motion information predictors of the first subset of motion information predictors based on the temporal difference between the image of the image portion and the image of the reference image portion; otherwise, in the case where it is determined that a temporal scaling process is not to be applied, the first processing means is operable to remove duplicates from among the motion information predictors of the first subset of motion information predictors such that a reduced subset comprising non-duplicate motion information predictors from among the motion information predictors of the first subset of motion information predictors and the second subset of motion information predictors is provided by processing performed by the first processing means and the second processing means.

In an embodiment, the device includes suppression means for obtaining the final set of motion information predictors wherein in the case where it is determined that a temporal scaling process is to be applied, the suppression means is operable to obtain the final set of predictors by removing duplicates from among the motion information predictors resulting from the concurrent processing of the first subset of motion information predictors and the second subset of motion information predictors; otherwise in the case where it is determined that a temporal scaling process is not to be applied, the first or second processing means is operable to obtain further motion information predictors, based on the reduced subset to provide a further second subset of motion information predictors and the suppression means is operable to remove duplicates from among the further second subset of motion information predictors.

In an embodiment, the device includes means for determining the complexity of the temporally scaling process of the first subset of motion information predictors and suppression means for obtaining the final set of motion information predictors which are non-duplicate; wherein, in the case where it is determined that the temporal scaling process will last for a longer duration than a predetermined duration threshold, the suppression means is operable to remove duplicates from among the motion information predictors resulting from the processing of the first subset of motion information predictors and the processing of the second subset of motion information predictors;

otherwise, in the case where it is determined that the temporal scaling process will last for a shorter duration than a predetermined duration threshold, the suppression means is operable to add to the reduced subset of motion information predictors obtained from the second subset of motion vector predictors, a motion information predictor resulting from processing of the first subset of motion information predictors which is not a duplicate of any of the motion information predictors of the reduced subset of motion information predictors; wherein the final set of motion information predictors comprises non duplicate motion information predictors from among the motion information predictors of the reduced subset of motion information predictors and the further second subset of motion information predictors.

In an embodiment, the second processing means comprises means for removing duplicates from among the motion information predictors of said second subset to provide a reduced subset of motion information predictors; and means for generating a further set of motion information predictors based on one of the motion information predictors of said second subset and including the said one of the motion information predictors of said second subset, wherein there are no duplicates among the further set of motion information predictors, the device further comprising suppression means for removing duplicates from among the reduced subset of motion information predictors and the further set of motion information predictors to provide a non-duplicate set of motion information predictors.

In an embodiment, the second processing means further comprises means for generating further motion information predictors based on the reduced subset of motion information predictors to provide a further second subset of motion information predictors; and means for removing duplicates from among the motion information predictors of the further second subset of motion information predictors and the non-duplicate set of motion information predictors to provide a second non-duplicate set of motion information predictors.

In an embodiment, the suppression means are operable to add, to the second non-duplicate set of motion information predictors, a motion information predictor resulting from the processing of the first subset of motion information predictors which is not a duplicate of any of the motion information predictors of the second non-duplicate set of motion information predictors to obtain the final set of motion information predictors.

According to a third aspect of the invention there is provided a method of deriving at least one motion information predictor for encoding or decoding of an image portion of an image by motion compensation with respect to at least one reference image portion, wherein for said image portion to be encoded or decoded, the method comprises: providing, for processing, at least two distinct first and second subsets of motion information predictors of a first set of motion information predictors; estimating a duration for processing at least one of the first and second subsets of motion information predictors based on data representative of the at least one subset; in dependence upon the estimated processing duration, processing of the motion information predictors of the first set comprising either: processing the first subset of motion information predictors and processing the second subset of motion information predictors wherein at least part of the processing of the second subset of motion information predictors is performed concurrently with at least part of the processing of the first subset of motion information predictors, or processing the first and second subsets of motion information predictors together; and obtaining, based on motion information predictors resulting from the processing of the motion information predictors of the first set, a final set of motion information predictors usable for predicting said image portion from the reference image portion.

In an embodiment the method includes comparing a duration of time for processing the first subset of motion information predictors based with a duration of time for processing the second subset of motion information predictors wherein the processing of the first set of motion information predictors is based on the comparison.

In an embodiment the method includes comparing the duration of time for processing the first subset and/or the duration of time for processing the second subset with a predetermined threshold wherein the processing of the first set of motion information predictors is based on the comparison.

In an embodiment the method includes processing of the first subset comprises a temporal scaling process of one or motion information predictors of the first subset.

In an embodiment the method includes the data representative of the first subset and/or the second subset comprises the data of each motion information predictor of the first subset and/or the second subset In an embodiment the method includes the data of each motion information predictor comprises the temporal distance for a temporal scaling process.

In an embodiment the method includes the data representative of the first subset and/or the second subset comprises the number of motion information predictors of the or each subset In an embodiment the method includes data representative of the first subset and/or the second subset comprises the maximum number of operations for processing the first subset and/or the second subset.

According to a fourth aspect of the invention there is provided a device device for deriving at least one motion information predictor for encoding or decoding of an image portion of an image by motion compensation with respect to at least one reference image portion, wherein the device comprises:

means for obtaining, at least two distinct first and second subsets of motion information predictors of a first set of motion information predictors;

means for estimating a duration for processing at least one of the first and second subsets of motion information predictors based on data representative of the at least one subset;

first processing means for processing the first subset of motion information predictors and second processing means for processing the second subset of motion information predictors in dependence upon the estimated processing duration, the second processing means being operable to either:

perform at least part of the processing of the second subset of motion information predictors concurrently with at least part of the processing of the first subset of motion information performed by the first processing means predictors, or process the first and second subsets of motion information predictors together; and the device further comprising means for obtaining, based on motion information predictors resulting from the processing of the motion information predictors of the first set, a final set of motion information predictors usable for predicting said image portion from the reference image portion.

In an embodiment the device is provided with comparison means for comparing a duration of time for processing the first subset of motion information predictors based with a duration of time for processing the second subset of motion information predictors wherein the processing of the first set of motion information predictors performed by the first processing means is based on the comparison.

In an embodiment the device is provided with comparison means for comparing the duration of time for processing the first subset and/or the duration of time for processing the second subset with a predetermined threshold wherein the processing of the first set of motion information predictors performed by the first processing means is based on the comparison.

In an embodiment the first processing means is operable to perform a temporal scaling process of one or motion information predictors of the first subset.

In an embodiment the data representative of the first subset and/or the second subset comprises the data of each motion information predictor of the first subset and/or the second subset In an embodiment the data of each motion information predictor comprises the temporal distance for a temporal scaling process.

In an embodiment the data representative of the first subset and/or the second subset comprises the number of motion information predictors of the or each subset In an embodiment the data representative of the first subset and/or the second subset comprises the maximum number of operations for processing the first subset and/or the second subset A further aspect of the invention provides a method of deriving at least one motion information predictor for encoding or decoding of an image portion of an image by motion compensation with respect to at least one reference image portion, wherein for said image portion to be encoded or decoded, the method comprises processing the motion information predictors of a first set of motion information predictors to obtain a final set of motion information predictors usable for predicting said image portion from the reference image portion; wherein the processing of the first set of motion information predictors comprises: sub-dividing the first set into at least two distinct first and second subsets of motion information predictors; estimating a duration for processing at least one of the first and second subsets of motion information predictors based on data representative of the at least one subset; in dependence upon the estimated processing duration, either: performing the processing of the first set of motion information predictors using the sub-division in such a way that at least part of the processing of the second subset of motion information is performed concurrently with at least part of the processing of the first subset of motion information predictors, or performing the processing of the first set of motion information predictors without using the sub-division.

A yet further aspect of the invention provides a device for deriving at least one motion information predictor for encoding or decoding of an image portion of an image by motion compensation with respect to at least one reference image portion, wherein the device comprises processing means for processing the motion information predictors of a first set of motion information predictors to obtain a final set of motion information predictors usable for predicting said image portion from the reference image portion; wherein the processing means comprises means for sub-dividing the first set into at least two distinct first and second subsets of motion information predictors; means for estimating a duration for processing at least one of the first and second subsets of motion information predictors based on data representative of the at least one subset; the processing means being operable to, in dependence upon the estimated processing duration, either: perform the processing of the first set of motion information predictors using the sub-division in such a way that at least part of the processing of the second subset of motion information is performed concurrently with at least part of the processing of the first subset of motion information predictors, or perform the processing of the first set of motion information predictors without using the sub-division.

An even further aspect of the invention provides a method of deriving at least one motion information predictor for encoding or decoding of an image portion of an image by motion compensation with respect to at least one reference image portion, wherein for said image portion to be encoded, the method comprises obtaining a first set of motion information predictors and concurrent processing of at least two distinct subsets of motion information predictors of the first set of motion information predictors, the concurrent processing providing a final set of motion information predictors usable for predicting said image portion from the reference image portion.

A fifth aspect of the invention provides a method of encoding a sequence of digital images into a bitstream, at least one portion of an image being encoded by motion compensation with respect to a reference image portion, wherein, for at least one image portion to encode, the method comprises: obtaining at set of motion information predictors usable for motion prediction of the image portion with respect to the at least one reference image portion in accordance with the method of any of the embodiments of the first or third aspect of the invention; selecting at least one motion information predictor from the set of information predictors for encoding the image portion; and encoding the image portion using the selected at least one motion information predictor.

The method may include encoding an information item identifying the selected motion information predictor.

A sixth aspect of the invention provides an encoding device for encoding a sequence of images into a bitstream, at least one portion of an image being encoded by motion compensation with respect to a reference image portion, the encoding device comprising: a device for deriving at least one motion information predictor in accordance with any of the embodiments of the second or the fourth aspect of the invention; selection means selecting at least one motion information predictor from the set of information predictors for encoding the image portion; and encoding means for encoding the image portion using the selected at least one motion information predictor.

A seventh aspect of the invention provides a method of decoding a bitstream comprising an encoded sequence of images, at least one portion of an image having been encoded by motion compensation with respect to a reference image portion, the method comprising for at least one image portion to be decoded: obtaining at set of motion information predictors usable for motion prediction of the image portion with respect to the at least one reference image portion in accordance with the method of any one of the embodiments of the first or third aspect of the invention; selecting at least one motion information predictor from the set of information predictors for decoding the image portion; and decoding the image portion using the selected at least one motion information predictor.

An eighth aspect of the invention provides a decoding device for decoding a bitstream comprising an encoded sequence of images, at least one portion of an image having been encoded by motion compensation with respect to a reference image portion, the decoding device comprising:

a device for deriving at least one motion information predictor in accordance with the device of any one of the embodiments of the second or fourth aspects of the invention; selection means for selecting at least one motion information predictor from the set of information predictors for decoding the image portion; and decoding means for decoding the image portion using the selected at least one motion information predictor.

It will be appreciated that embodiments of the different aspects of the invention may be used for P and B slices and for both uni and bi-directional Inter predictions.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which:—

FIG. 9 is a flow chart illustrating steps of a method for obtaining a set of motion information predictors according to a fourth embodiment of the invention;

Figure 10C:
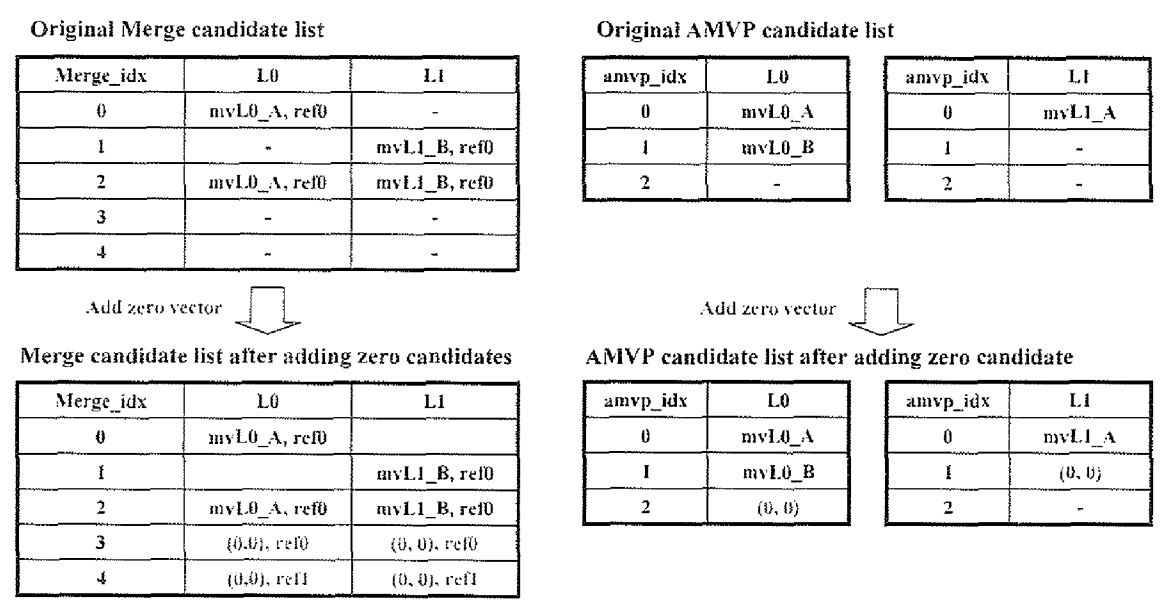
Figure 11:
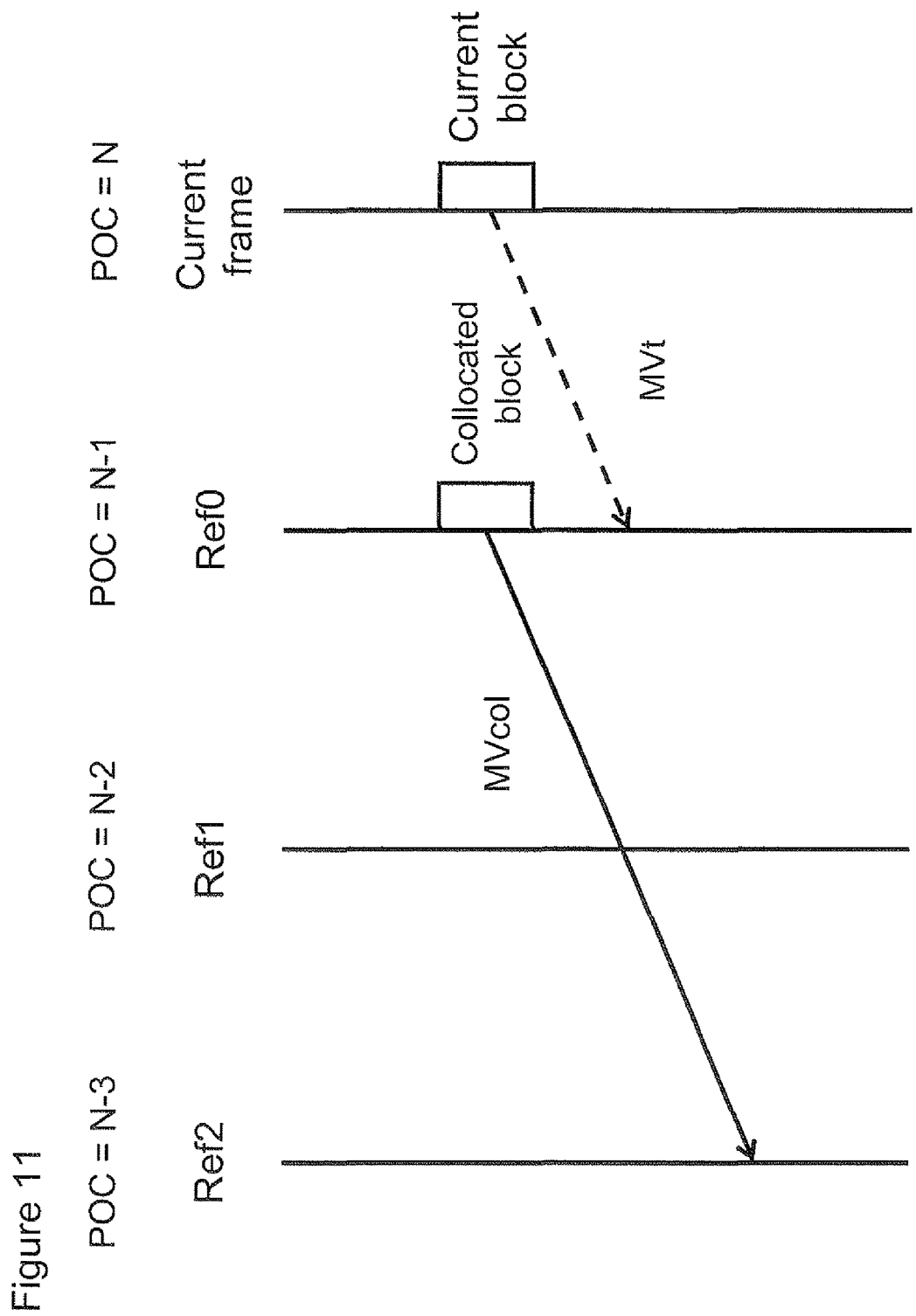

FIGS. 10(*a*)-10(*c*) schematically illustrate schemes for the generation of motion vector predictors in accordance with one or more embodiments of the invention; and FIG. 11 is a schematic diagram for illustrating a process of scaling of a temporal predictor used in embodiments of the invention.

Figure 3:
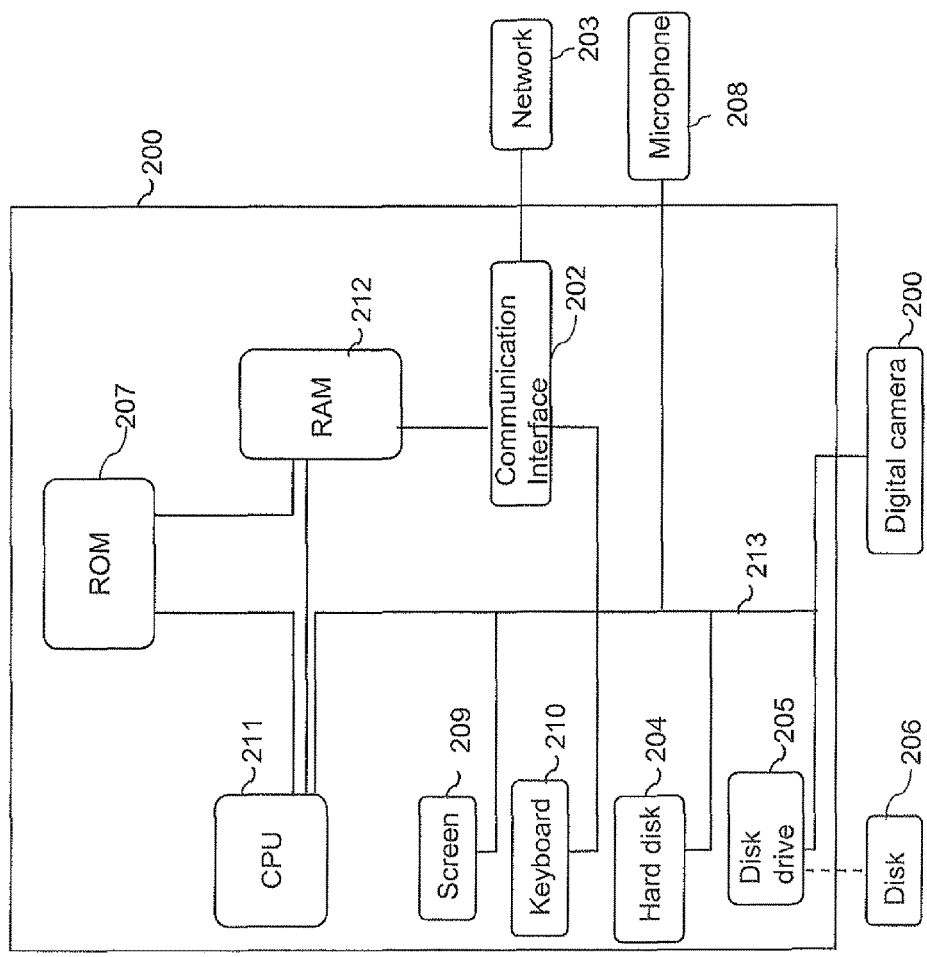
FIG. 3 is a block diagram illustrating components of a processing device in which embodiments of the invention may be implemented.

FIG. 3 schematically illustrates a processing device 200 configured to implement at least one embodiment of the present invention. The processing device 200 may be a device such as a micro-computer, a workstation or a light portable device. The device 200 comprises a communication bus 213 to which there are preferably connected:

a central processing unit 211, such as a microprocessor, denoted CPU;

a read only memory 207, denoted ROM, for storing computer programs for implementing the invention;

a random access memory 212, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 202 connected to a communication network 203 over which digital data to be processed are transmitted.

Optionally, the apparatus 200 may also include the following components:

a data storage means 204 such as a hard disk, for storing computer programs for implementing methods of one or more embodiments of the invention and data used or produced during the implementation of one or more embodiments of the invention;

a disk drive 205 for a disk 206, the disk drive being adapted to read data from the disk 206 or to write data onto said disk;

a screen 209 for displaying data and/or serving as a graphical interface with the user, by means of a keyboard 210 or any other pointing means.

The apparatus 200 can be connected to various peripherals, such as for example a digital camera 200 or a microphone 208, each being connected to an input/output card (not shown) so as to supply multiMedia data to the apparatus 200.

The communication bus provides communication and interoperability between the various elements included in the apparatus 200 or connected to it. The representation of the bus is not limiting and in particular the central processing unit is operable to communicate instructions to any element of the apparatus 200 directly or by means of another element of the apparatus 200.

The disk 206 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 207, on the hard disk 204 or on a removable digital medium such as for example a disk 206 as described previously. According to a variant, the executable code of the programs can be received by means of the communication network 203, via the interface 202, in order to be stored in one of the storage means of the apparatus 200 before being executed, such as the hard disk 204.

The central processing unit 211 is adapted to control and direct the execution of the instructions or portions of software code of the program or programs according to the invention, instructions that are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
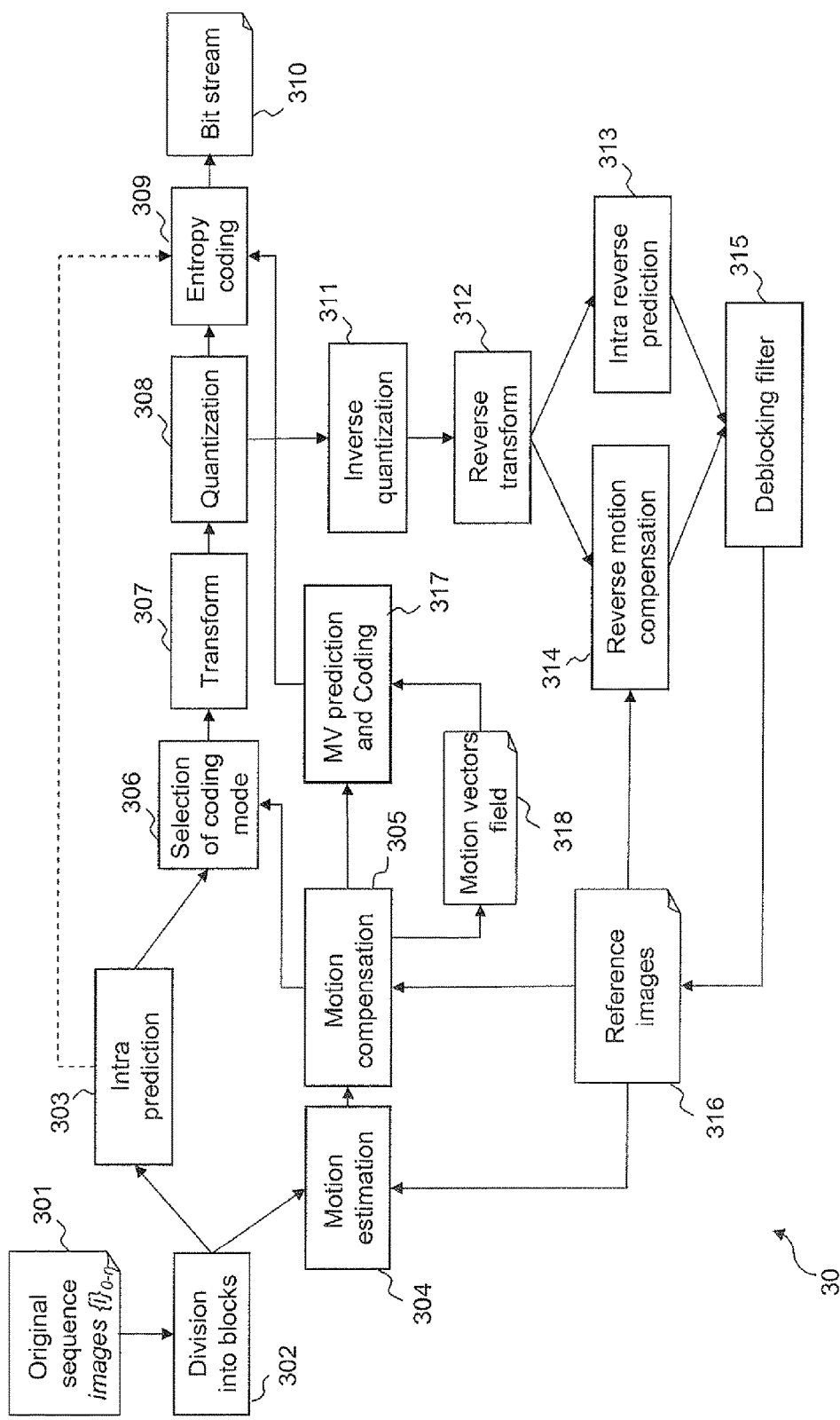
FIG. 4 is a block diagram illustrating components of an encoder device according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 211 of device 200, at least one corresponding step of a method implementing at least one embodiment of encoding an image of a sequence of images according to one or more embodiments of the invention.

An original sequence of digital images i0 to in 301 is received as an input by the encoder 30. Each digital image is represented by a set of samples, known as pixels.

A bitstream 310 is output by the encoder 30 after implementation of the encoding process.

The bitstream 310 comprises a plurality of encoding units or slices, each slice comprising a slice header for transmitting encoding values of encoding parameters used to encode the slice and a slice body, comprising encoded video data.

The input digital images i0 to in 301 are divided into blocks of pixels by module 302. The blocks correspond to image portions and may be of variable sizes (e.g. 4×4, 8×8, 16×16, 32×32 pixels). A coding mode is selected for each input block. Two families of coding modes are provided: coding modes based on spatial prediction coding (Infra prediction), and coding modes based on temporal prediction (Inter coding, Bidir, SKIP). The possible coding modes are tested.

Module 303 implements Intra prediction, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 304 and motion compensation module 305. Firstly a reference image from among a set of reference images 316 is selected, and a portion of the reference image, also called reference area or image portion, which is the closest area to the given block to be encoded, is selected by the motion estimation module 304. Motion compensation module 305 then predicts the block to be encoded using the selected area. The difference between the selected reference area and the given block, also called a residual block, is computed by the motion compensation module 305. The selected reference area is indicated by a motion vector.

Thus in both cases (spatial and temporal prediction), a residual is computed by subtracting the prediction from the original predicted block.

In the INTRA prediction implemented by module 303, a prediction direction is encoded. In the temporal prediction, at least one motion vector is encoded.

Information relative to the motion vector and the residual block is encoded if the Inter prediction is selected. To further reduce the bitrate, the motion vector is encoded by difference with respect to a motion vector predictor. Motion vector predictors of a set of motion information predictors is obtained from the motion vectors field 318 by a motion vector prediction and coding module 317.

The set of motion vector predictors from which a motion vector predictor is selected for encoding of a current motion vector is generated as will be explained in more detail hereafter with respect to any one of FIGS. 7 to 10. For a given current block to be encoded, in some embodiments of the invention a number N of motion vector predictors is determined, and consequently the index of the selected motion vector predictor, which is an item of information representative of the selected motion vector predictor, can be encoded using a predetermined number of bits according to the number N of motion vector predictors. This predetermined number of bits can be also retrieved by the decoder even in case of losses, therefore it may be ensured that the decoder will be able to parse the bitstream even in case of errors or losses. The N motion vector predictors are selected according to various embodiments of the invention to be all different from one another so as to enhance the compression efficiency.

The encoder 30 further comprises a selection module 306 for selection of the coding mode. The selection module 306 applies an encoding cost criterion, such as a rate-distortion criterion, to determine which is the best mode between the spatial prediction mode and the temporal prediction mode. In order to further reduce redundancies a transform is applied by transform module 307 to the residual block, the transformed data obtained is then quantized by quantization module 308 and entropy encoded by entropy encoding module 309. Finally, the encoded residual block of the current block being encoded is inserted into the bitstream 310, along with the information relative to the predictor used such as the index of the selected motion vector predictor. For the blocks encoded in 'SKIP' mode, only a reference to the predictor is encoded in the bitstream, without any residual block.

The encoder 30 also performs decoding of the encoded image in order to produce a reference image for the motion estimation of the subsequent images. This enables the encoder and the decoder receiving the bitstream to have the same reference frames. The inverse quantization module 311 performs inverse quantization of the quantized data, followed by an inverse transform by reverse transform module 312. The reverse intra prediction module 313 uses the prediction information to determine which predictor to use for a given block and the reverse motion compensation module 314 actually adds the residual obtained by module 312 to the reference area obtained from the set of reference images 316. Optionally, a deblocking filter 315 is applied to remove the blocking effects and enhance the visual quality of the decoded image. The same deblocking filter is applied at the decoder, so that, if there is no transmission loss, the encoder and the decoder apply the same processing.

Figure 5:
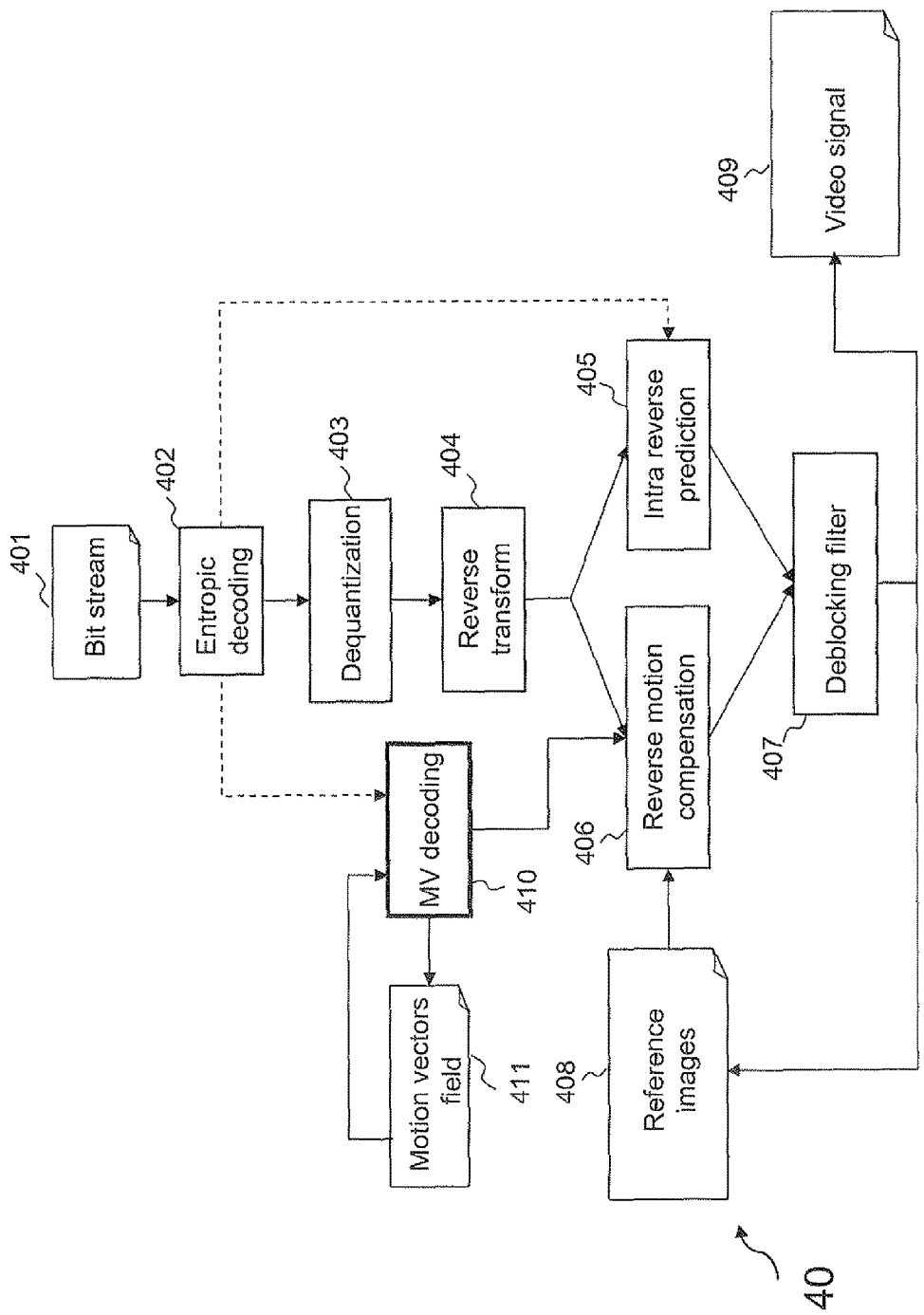
FIG. 5 is a block diagram illustrating components of a decoder device according to embodiments of the invention.

FIG. 5 illustrates a block diagram of a decoder 40 according to at least one embodiment of the invention. The decoder is represented by connected modules, each module being adapted to implement, for example in the form of programming instructions to be executed by the CPU 211 of device 200, a corresponding step of a method implementing an embodiment of the invention.

The decoder 40 receives a bitstream 401 comprising encoding units, each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 402. The residual data are then dequantized by module 403 and then a reverse transform is applied by module 404 to obtain pixel values.

The mode data are also entropy decoded and based on the mode, an INTRA type decoding or an INTER type decoding is performed.

In the case of INTRA mode, an INTRA predictor is determined by intra reverse prediction module 405 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 410.

Motion vector decoding module 410 applies motion vector decoding for each current block encoded by motion prediction. Once an index of the motion vector predictor for the current block has been obtained the actual value of the motion vector associated with the current block can be decoded and used to apply reverse motion compensation by module 406. The reference area indicated by the decoded motion vector is extracted from a reference image 408 to apply the reverse motion compensation 406. The motion vector field data 411 is updated with the decoded motion vector in order to be used for the inverse prediction of the next decoded motion vectors.

Finally, a decoded block is obtained. A deblocking filter 407 is applied; similarly to the deblocking filter 315 applied at the encoder. A decoded video signal 409 is finally provided by the decoder 40.

Figure 1:
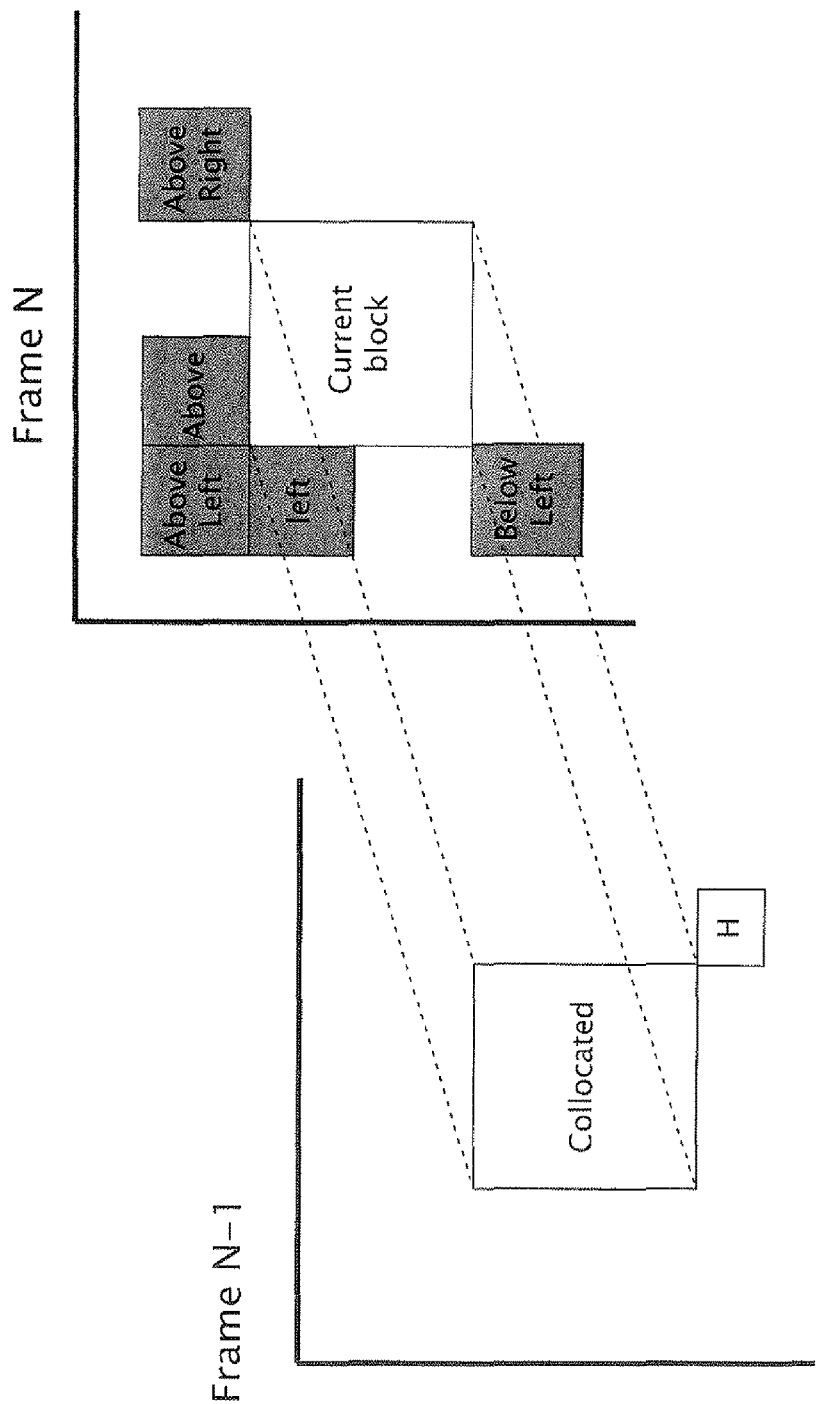
FIG. 1 is a schematic diagram of a set of motion vector predictors used in a motion vector prediction process in the context of embodiments of the present invention.
Figure 6:
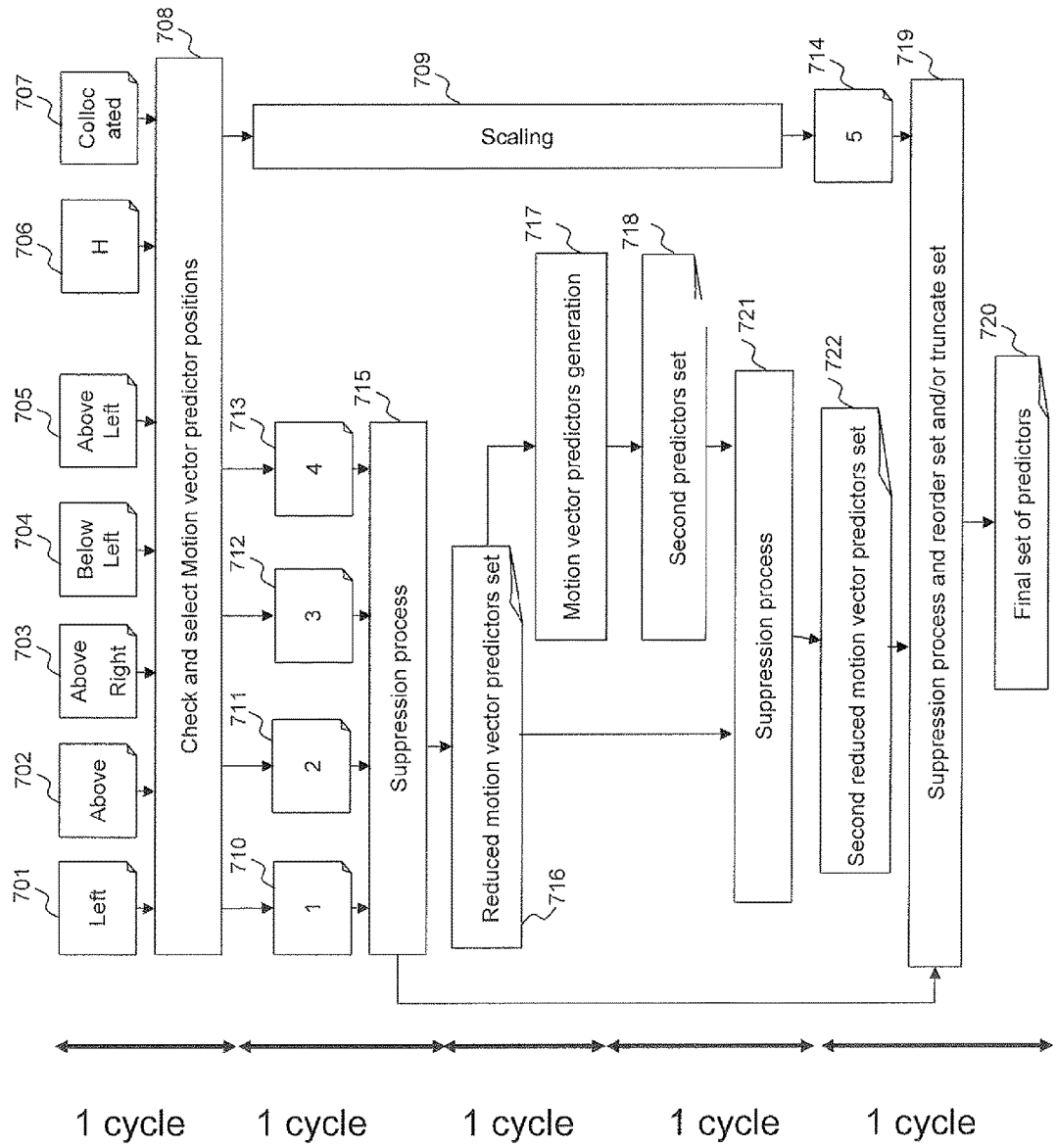
FIG. 6 is a flow chart illustrating steps of a method for obtaining a set of motion information predictors according to a first embodiment of the invention.

FIG. 6 is a flow chart illustrating steps of a method according to a first embodiment of the invention for deriving a set of potential motion information predictors suitable for the encoding of an image portion of an image with respect to a reference image portion. In the first step of the method, 7 block positions are considered (701 to 707). These positions correspond to the spatial and temporal positions depicted in FIG. 1. Module 708 verifies the availability of the motion vectors of the 7 block positions and selects 4 motion vectors as motion vector predictors. In this module, a motion vector is available as a predictor if it exists and if motion vector block is not Intra coded. The selection and the verification of the 4 motion vector predictors are described under the following conditions:

If the "Left" motion vector (701) is available (if it exists and if this block is not Intra coded), the motion vector of the "Left" block is selected and used as the predictor 1 (610).

If the "Above" motion vector (702) is available, the motion vector of the "Above" block is selected and used as the predictor 2 (711).

If the "Above Right" motion vector (703) is available, the motion vector of the "Above Right" block is selected and used as the predictor 3 (712).

If the "Below Left" motion vector (704) is available, the motion vector of the "Below Left" block is selected and used as the predictor 4 (713).

If one (or more) of these predictors is not available and if the "Above Left" motion vector (705) is available, the motion vector of the "Above Left" block is added to the set of selected motion vector predictors after the added spatial predictor.

If the "H" motion vector is available, the motion vector of the "H" block is selected and used as the predictor 5 (714). If the "H" block is not available, the availability of the "collocated" motion vector (the motion vector of the block at the same position in the current block) is checked and, if the collocated motion vector is available, it is used as the temporal predictor. The availability check of the module 708 requires 1 cycle.

Figure 2:
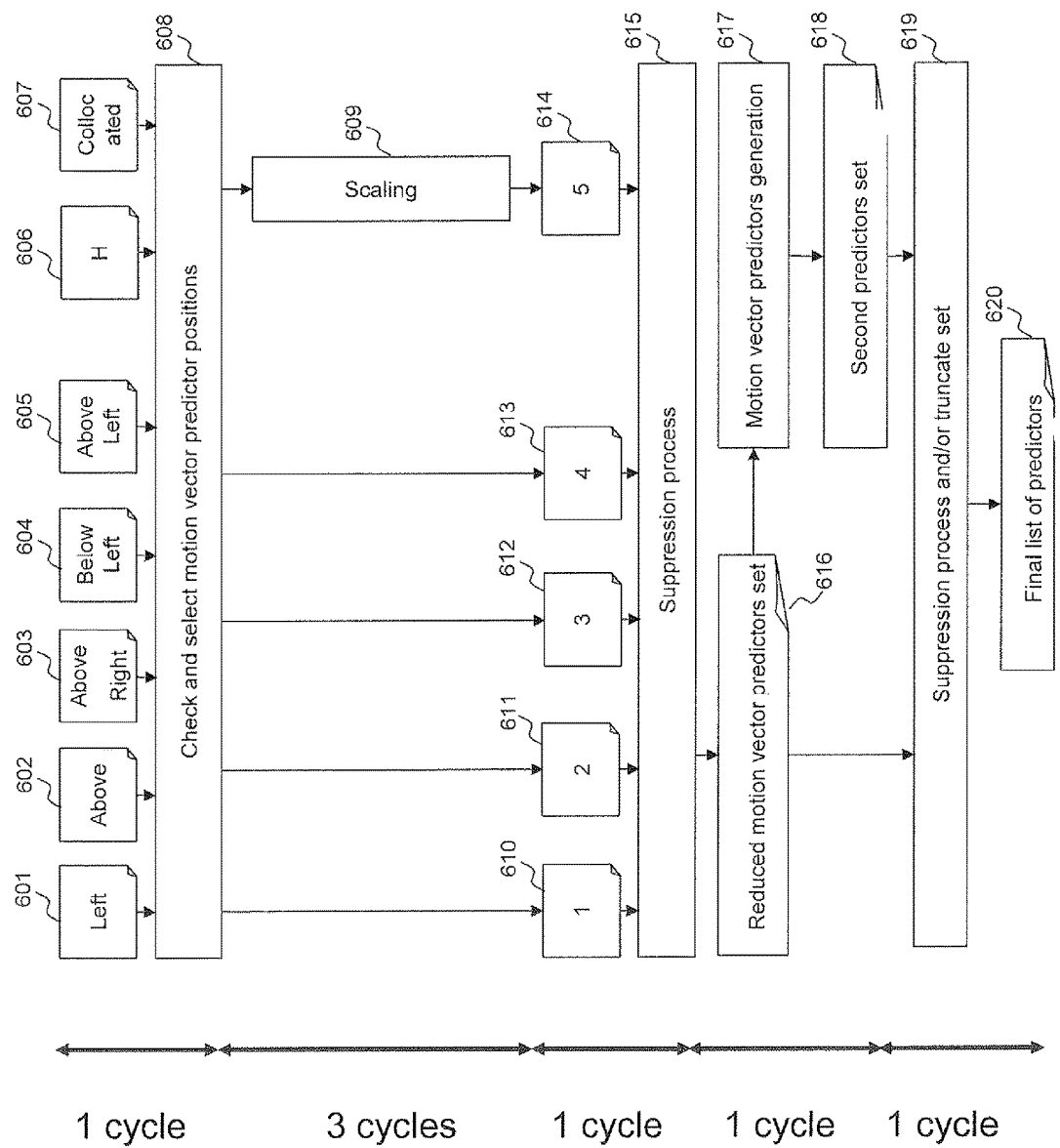
FIG. 2 is a flow chart illustrating steps of a process of the prior art for deriving a set of motion vector predictors.

Since the set of motion vector predictors selected at the beginning of the process contains only the spatial predictors 1, 2, 3, 4 the complexity of the selection process 715 is reduced compared to the selection process of the prior art in FIG. 2 comprising 4 spatial and 1 temporal predictors.

The suppression process consists in comparing each selected predictor to all the other selected predictors and in removing those selected predictors which are equal to another selected predictor (while retaining the other selected predictor of which the removed predictor is a duplicate) to provide a set of predictors in which none of the predictors are duplicates of one another. The suppression process for P slices takes into account the values of the motion vectors and their reference frame indexes. Accordingly, the two components of a motion vector and its reference frame index are compared to all the corresponding components of the other motion vectors and only if these three values are equal, is the predictor is removed from (or not added to) the set. For a B frame, this criterion can be extended to the direction and the lists. Thus, a predictor is considered as a duplicate predictor if it uses the same direction, the same lists (L0, L1, orL0and L1), the same reference frame indexes and the same value of the motion vectors (MV_L0 and MV_L1 for bi prediction) in the set of selected motion vectors. The suppression process lasts 1 cycle when 5 predictors at most need to be compared. Indeed, it may be considered that 12 comparisons can be computed in 1 cycle. The maximum number of comparisons for the suppression process in the most complex case is equal to the Sum of 0 to N−1. Since the maximum number of predictors at the beginning of the suppression process is 4 instead of 5, the maximum number of comparisons to be performed is 6(i.e. 3+2+1=6) compared to 10 as for the 5 selected predictors of the prior art of FIG. 2. At the end of this suppression process 715, a reduced set of predictors 716 is generated. The reduced motion vector predictor set 716 contains at most 4 predictors compared to 5 in the prior art.

Motion vector predictor's generation module 717 generates new predictor candidates based on the predictors of the reduced motion vector predictor set. Several schemes for creating such predictors may be used and one such scheme will be described later with reference to FIG. 10(*a*) to (*c*). It may be considered that the process performed by motion vector predictor's generation module lasts at least 1 cycle and produces a second set of predictors 718. Since the set of reduced predictors 716 generally contains less predictors than the reduced predictors set 616 of the prior art illustrated in FIG. 2, on average less combined predictors and scaled predictors are generated in the reduced motion vector predictor set 717 compared to that of the prior art and the complexity of the process is reduced.

Next, suppression processing module 721 which operates in a similar manner to the suppression process module 715, removes the duplicate candidates from the second predictors set 718 and the reduced predictors set 716 by comparing the respective motion vector components and associated motion information parameters. In the prior art illustrated in FIG. 2, the duration of this particular process can reach 3 cycles depending on the number of predictors generated in the second predictor set 718, particularly in the case where the motion vector predictor generation of the current HEVC design is applied. Suppression process 721 produces a second reduced set of motion vector predictors 722.

Finally, the temporal predictor 714 is compared to the second reduced set of motion vector predictors 722 in the module 719. In the suppression and reordering processing performed by module 719, the temporal predictor is compared to, at most, 5 predictors in order to determine if the temporal predictor is a duplicate predictor. If it is a non-duplicate predictor, the temporal predictor is inserted into the list of predictors just before the last non duplicate spatial predictor. The temporal position has been determined by the suppression processing module 715 and transmitted to the processing module 719, and corresponds to the number of predictors in 715. The list of predictors is truncated if it contains more than 5 predictors in order to produce the final set of predictors 720. It may be noted that the maximum number of comparisons performed by the module 719 is 5 in the most complex case which is a reduction compared to that of the suppression module 619 of the prior art illustrated in FIG. 2.

In an alternative embodiment the suppression processing module 719 may operate in the same manner to the suppression processing module 619 of the prior art. In such a case the temporal predictor is only added to the set of predictors if the reduced set of predictors 722 contains at most 4 predictors. Otherwise it is added to the end of the list of predictors.

Figure 7:
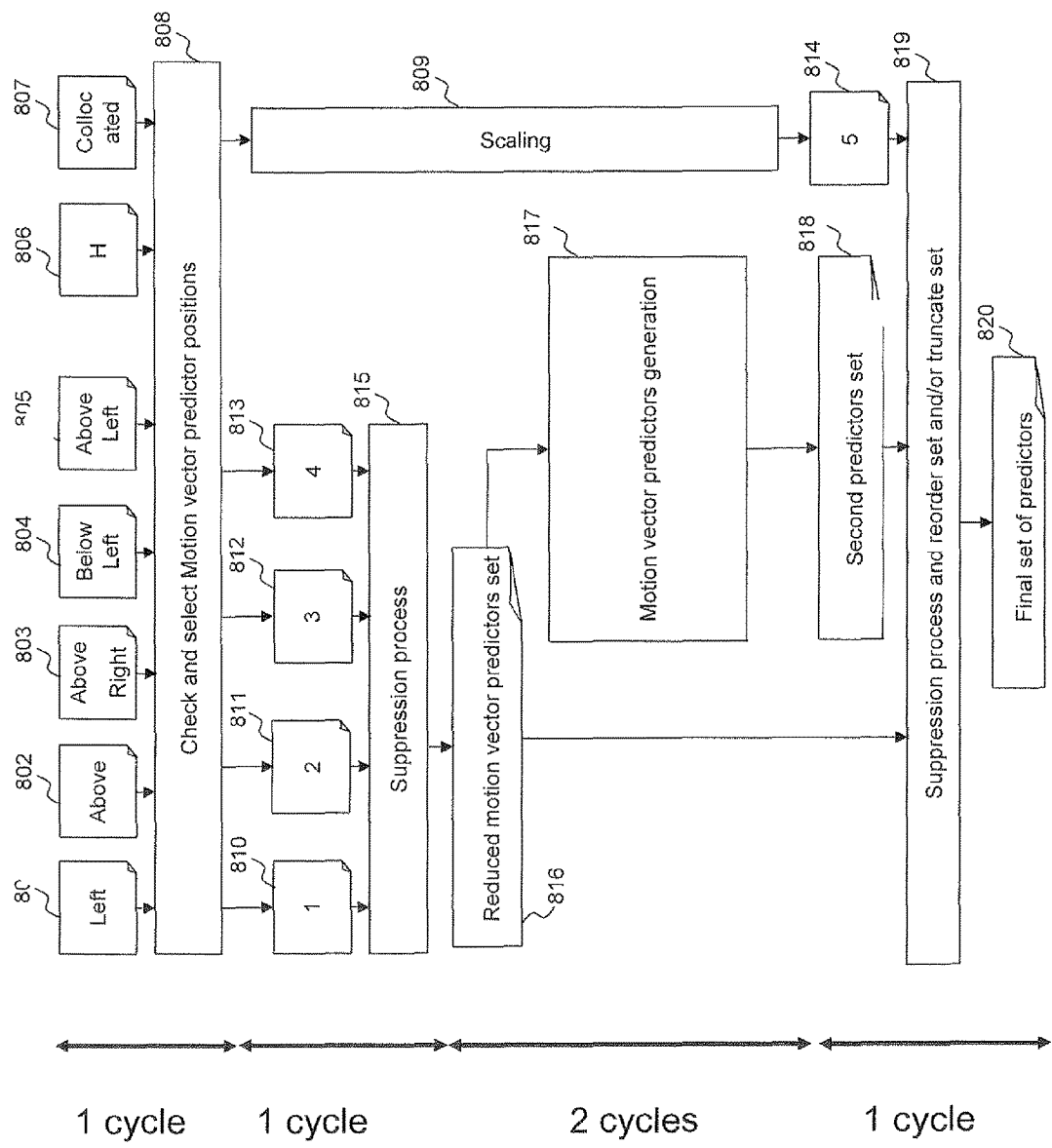
FIG. 7 is a flow chart illustrating steps of a method for obtaining a set of motion information predictors according to a second embodiment of the invention.

FIG. 7 illustrates a second embodiment of the invention. The main difference with respect to the embodiment of FIG. 6 is that the Motion vector predictor generation process performed by module 817 lasts for a duration of 2 cycles instead of 1 cycle as in the case of module 717 of FIG. 6. In the case of FIG. 7, the suppression process for removing duplicate predictors of the second predictors set 818 is not executed in parallel to the temporal scaling process 809. Consequently, in FIG. 7, in the suppression module 819, the temporal predictor 814 is compared to both the predictors of the reduced set of motion vector predictors 816 and the predictors of the second predictors set 818. In this process if temporal predictor 814 is a non-duplicate predictor of the motion vector predictors of reduced motion vector predictors set 816, the temporal predictor 814 is added to the reduced set of motion vector predictors after the spatial predictors. Next, the predictors of the second predictor set 818 are compared to the predictors of the reduced set of motion vector predictors 816, with the temporal predictor 814 if added, and to the other predictors of the second predictors set 818.

The advantage of the processing of the embodiments of FIG. 6 or FIG. 7 results from the full execution of the scaling process 709 in parallel with the first suppression process 715 or 815 and the motion vector predictor generation process 717 or 817. According to the complexity of each process, additional suppression processes 721 can be included in the method to predetermine a non-duplicate set in order to reduce the complexity of the final suppression process 719. Thus, in the first embodiment of the invention it may be considered that the overall suppression process is split into two suppression processes implemented by modules 721 and 719.

The parallel scaling process has a beneficial impact on the coding efficiency. Indeed, since the temporal predictor 714 or 814 is not used to generate the second set of predictors 718 or 818 this has an impact on the generation of the motion vector predictors.

Figure 8:
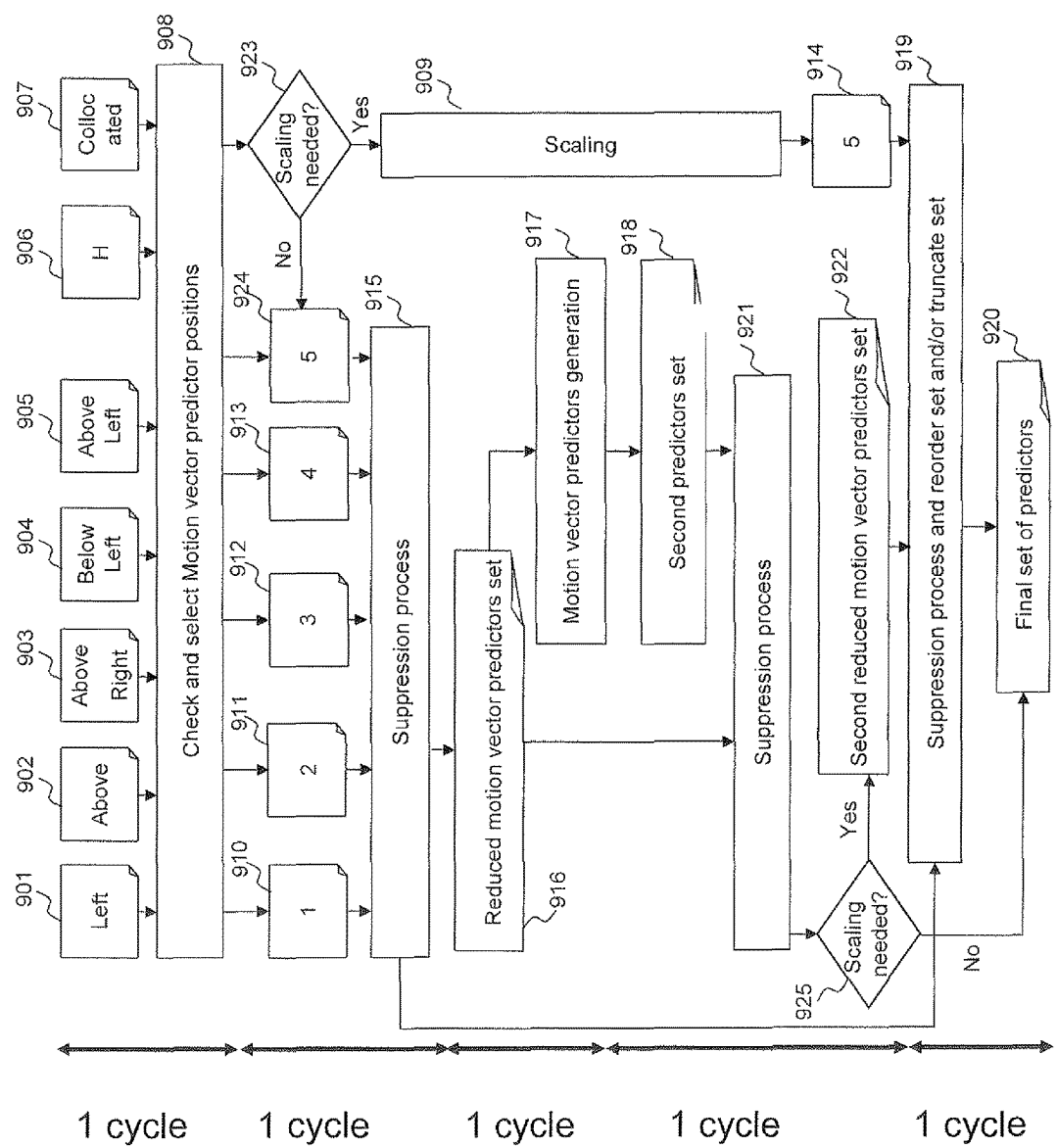
FIG. 8 is a flow chart illustrating steps of a method for obtaining a set of motion information predictors according to a third embodiment of the invention.

Steps of a method of generating a set of motion vector predictors in accordance with a third embodiment of the invention is illustrated in the flow chart of FIG. 8. The method according to the third embodiment of the invention further reduces the impact on the coding efficiency.

Selection module 908 operates in a similar manner to corresponding selection modules 708 and 808 of the first and second embodiments of the invention to select 4 motion vectors 910 to 913, based on their availability, from spatial and temporal block positions 901 to 907.

The main difference is the use of a scaling decision module 923. In the scaling decision module 923 the temporal distance of the temporal motion vector and the temporal distance of the temporal predictor (predictor number 5) are compared. For a uni-directional type of inter prediction this means that the Picture Order Count (POC) difference between the temporal frame (the frame of H and collocated blocks) and the reference frame pointed to by the temporal motion vector (H or collocated) is compared to the temporal distance between the current frame and the reference frame of the temporal predictor. If these temporal distances are equal, the scaling decision module 923 returns the value "No". Otherwise, it means that a scaling process is needed, and the scaling decision module 923 returns the value "Yes". For a Bi-directional prediction type, the decision module 923 compares the temporal distances for each list and the returned decision depends on the decisions for both lists. Thus, if for both lists no scaling is needed, scaling decision module 923 returns the value "No" and if at least one scaling process is needed for one list, the scaling decision module 923 returns the value "Yes".

If the scaling decision module 923 returns the value "No", the temporal predictor 5 (924) is used in the suppression process 915. Consequently, the generation of motion vector predictors 917 uses the value of the temporal predictor 5 to generate the second set of predictors 918. Then, the suppression process 921 is applied to the reduced set of predictors 916 and the set of second predictors 918. Next, a decision module 925 makes a decision on the provision of the final set of motion vector predictors based on the decision of the scaling decision module 923—i.e. the decision made by scaling decision module 923 is used to determine whether or not the reduced predictors set produced by the suppression process 921 is the final predictor set—when a "No" is returned by decision module 923 it is determined that the reduced predictors set produced by the suppression process 921 is the final predictor set. Thus, when scaling decision module 923 returns a "No" indicating scaling is not required, the derivation of the predictors set operates in a similar manner to the derivation of the set of predictors as illustrated in FIG. 2.

Otherwise, if the scaling decision module 923 returns the value "Yes", indicating that the temporal predictor is scaled in module 909 to produce a temporal predictor number 5 (914) it is determined that the reduced predictors set produced by the suppression process 921 is not the final predictor set. In this case the suppression process module 915 has not used the temporal predictor for the suppression process and the motion vector predictor generation module 917 has not used the temporal predictor to create new predictors. Consequently, in a similar manner to the process illustrated in the flow chart of FIG. 6, the scaling process 909 of the temporal predictor 5 is executed in parallel to the generation of motion vector predictors 917. The scaling decision module 925, after the second suppression process, returns the value "Yes". Thus the scaled temporal predictor 914 is compared to the predictors of the second reduced set of predictors 922 in the suppression process 919. As in the case of the suppression process module 719 of FIG. 6, if the temporal predictor 914 is a non-duplicate predictor of the predictors in the second reduced set of predictors, the suppression and reordering module 919 inserts the temporal predictor into the set of predictors after the first reduced predictors set 916 to provide the final set of predictors 920.

To summarize this embodiment, the scaling process 909 is executed in parallel to the generation process 917 of the second set 918 only if the temporal predictor needs to be scaled.

If we consider that the generation of the motion vector predictors 917 lasts 1 cycle, and if the temporal predictor does not need a scaling process, 4 cycles are needed to produce the Merge predictors set, otherwise 5 cycles are needed. Consequently the process is reduced by 2 cycles in the most complex case as in the first embodiment. The main advantages of this embodiment compared to the previous one are the use of the temporal predictor for the generation of the second set of the predictors only when the temporal predictor does not need scaling. Consequently, the coding efficiency may be improved compared to the first embodiment.

In an additional embodiment, it is possible to consider the complexity of the scaling process. For example, it may be possible to know if the scaling process requires only one cycle. One cycle is only needed if the sign of the motion vector predictor needs to be changed. In that case, the temporal predictor is available in the same time as the reduced predictors set 916. Thus, the temporal predictor can be used for the suppression process 921. In that case, the scaling decision module 925 returns the value "Yes" and the module 922 and 919 are not needed to provide the final set of predictors. Consequently, the duration of the derivation process is reduced by one cycle because the suppression process 919 lasts 1 cycle.

FIG. 9 is flow chart illustrating a method of deriving a set of motion vector predictors in accordance with a fourth embodiment of the invention. The flow chart of FIG. 9 is based on that of FIG. 6. As a consequence the modules 1001 to 1020 and 1022 of FIG. 9 are respectively the same as the modules 701 to 720 and 720 of FIG. 6. The differences are the use in parallel of the non-duplicate predictors by adding offsets as will described in the generation of motion vector predictors with respect to FIGS. 10(a)-(c). When the first predictor 1 1010 is defined, module 1023 generates a list non-duplicate predictors. As explained with respect to FIG. 10(c), this process consists in adding offsets to one or both motion vector components of the first predictor 1010. The set of non-duplicate predictors 1024 contains 4 predictors which are all different to one another and different to the first predictor 1010 available after the availability check implemented by the selection processing module 1008. As a consequence, in this embodiment, the set of non-duplicate predictors 1024, when added to the first predictor 1010, contains 5 non-duplicate predictors as fixed for the Merge mode. The generation of non duplicate predictors is executed in parallel to the suppression process 1015. Suppression processing module 1025 compares the non-duplicate predictors set 1024 with the reduced predictors set 1016 in order to obtain only 5 predictors. The non-duplicate predictors set 1026 contains the reduced predictors set 1016 followed by the non-duplicate predictors set generated in 1024. It may be noted that the suppression process 1025 generally requires a maximum of 6 comparisons. The most complex case happens when the reduced motion vector predictors set 1016 contains 4 predictors. The set of non-duplicate predictors 1024 contains 4 predictors. Theoretically, the suppression process requires 16 comparisons in the most complex case (4 predictors of reduced motion vector predictors set 1016 by 4 predictors of non-duplicate predictors set 1024). However, the motion vector predictors in the non-duplicate predictors set 1024 are different from the first predictor, so only the second, the third and the fourth predictors of the reduced motion vector predictor set 1016 need to be compared to the set of non-duplicate motion vector predictors 1024. As a consequence, 12 (4 by 3) comparisons are needed. The predictors are all different to one another in the set of non-duplicate predictors 1024, so in the most complex case, if the 3 first predictors of the non-duplicate predictors 1024 are equal to the 3 last predictors of reduced motion vector predictors set 1016, it can be assumed that the last predictor in 1024 is different to the predictor of reduced motion vector predictors set 1016. Thus, only 9 (3 by 3) comparisons are needed.

Next, a second set of motion vector predictors 1018 is generated by motion vector predictor's generation module 1017. The suppression and reorder process 1021 checks if the motion vector predictors of the second predictors set 1018 are non-duplicate compared to the non-duplicate set 1026 which already contains 5 predictors. If a predictor of the second predictors set 1018 is different from all the others, it is inserted at the position of the number of predictors in the reduced predictors set 1016 (after the predictors of the reduced motion vector predictors set 1016 in the list). The subsequent steps 1022, 1019, and 1020 operate in the same manner as the processing of modules 722, 719 and 720 of FIG. 6.

It may be noted that the generation of non-duplicate predictors 1023 can be added at the end of the derivation process, after the suppression process 1019. This would require an additional suppression process which needs one more cycle and would not result the same predictors set ordering.

The fourth embodiment has several advantages. Firstly, in this embodiment, each predictor position has a value. Consequently, the method provides a more robust process than the current design of HEVC. Indeed, an encoder may use a predictor index without value at the decoder which may cause decoder a crash. This can occur, for example, when network errors occur.

This embodiment compensates for the loss of coding efficiency of the parallel scaling. Moreover, this modification also compensates for the loss of coding efficiency of a reduction of the number of candidates generated in the motion vectors predictors' generation of module 1017. With these non-duplicate predictors, only 2 predictors need to be generated in 1021. Consequently, the suppression process 1021 needs only 10 comparisons in the most complex case. Thus, only one cycle is needed instead of 3 for the most complex case of the current HEVC design presented in FIG. 2. With this simplification, only 5 cycles in the most complex case are needed to derive the Merge predictors set instead of 11 for the current HEVC design.

It will be appreciated that the fourth embodiment of FIG. 9 may be easily combined with the third embodiment presented in FIG. 8.

Examples of processes for the generation of further motion vectors as predictors implemented by the motion vector predictors generation modules 717, 817, 917 and 1017 of FIGS. 6, 7, 8 and 9 respectively will now be described with reference to FIGS. 10(a)-(c). The current HEVC design uses 3 schemes to add new predictors based on the current set generation. The first scheme is used for B slices. The motion vector predictor generation involves combining the predictors of the reduced predictors set 716, 816, 916, 1016 of FIGS. 6, 7, 8 and 9 respectively. A combined predictor is generated by selecting the motion vector of listL0of a first predictor and by selecting the motion vector of list L1 from another predictor. For example, the first possible combined predictor has the motion vector (and ref index) fromL0of the first predictor of 716 and the motion vector (and ref index) from L1 of the second predictor of 716. In the current HEVC design, 12 possible combined predictors can be generated. FIG. 10(a) shows an example of this process. The second scheme may only be used for B slices. The scaled predictor comprises changing unidirectional predictors with bi-directional predictors. If a predictor of 716 is uni-directional, the motion vector is created in the opposite list based on the initial motion vector. For example, if the first predictor of 716 is unidirectional and if it points toL0with the ref index 0, the value of its motion vector is scaled to point to the ref index 0 of L1. The built predictor contains the ref index 0 and the motion vector value forL0and the ref index 0 and the scaled vector for list L1. This new bidirectional predictor is added to the second predictors set (718). This kind of predictor generation is very complex because it needs to scale motion vectors, so this increases the number of cycles for the module 717 (3 cycles). Thus scaling process may be limited to inverse the sign of the motion vector value component which can be executed in one cycle, instead of 3 for the classical scaling process. FIG. 10(b) shows an example of this generation.

Another method of generating new motion vector predictors is by changing bi-directional predictors to unidirectional predictors. In that case, when a predictor is bi-directional 2 new predictors can be generated (one for each list). This is a low complexity process compared to the scaled motion vector process of FIG. 10(a).

In the current design of HEVC, at the end of the list a "zero motion vector" value is added. For the Merge, the zero value is set for both Motion vectors of L0and L1. And if possible, the reference frame index of each list is incremented to create other zero predictors. Thus, only the ref index is changed. If N ref index are used in both lists, N zero vectors can be added to the set of predictors. FIG. 10(c) illustrates an example such a process of generation of motion vector predictors.

Moreover, it is possible to use non duplicate predictors by adding one or more offsets to the components or several components of one available predictor of the initial set of predictors. For example, if only one predictor is in the initial set of predictors, it is possible to generate 4 predictors which are all different. For example, if we consider that the predictor in the list is unidirectional, the first predictor is generated by adding an offset value on one component of the first motion vector. The second predictor is generated by adding the inverse offset to the first component. The third one is obtained by adding the offset to the second component and the fourth by adding the inverse offset to the second component. It may be noted that this process can be applied on the first candidate, so that the predictor can be derived before the suppression process 715.

FIG. 11 shows an example of a scaling for the temporal predictor as applied in scaling modules 709, 809, 909 and 1009 of FIGS. 6, 7, 8, and 9 respectively. In this figure, the collocated motion vector MVcol in reference frame Ref0 pointed to Ref2 with the POC (Picture Order Count) equal to N−3. The reference frame of the temporal predictor MVt has been determined and is equal to Ref0 (POC number equal to N−1). The temporal distance iDiffPocD of the collocated motion vector is equal to the POC of Ref2 minus the POC of Ref0. Thus, its temporal distance is equal to:

$$iDiffPocD=(N-3)-(N-1)=2$$

In the same way, the temporal distance iDiffPocB which needs to be covered by the temporal predictor is equal to the POC of the current frame N minus the POC of Ref0:

iDiffPocB=(N)−(N−1)=1

Theoretically, the scale motion vector for the temporal predictor is equal to:

MVt=(iDiffPocB*MVcol)/iDiffPocD

Thus in the example, each component (Horizontal and vertical) is divided by 2. However in the current HEVC design, the scaling of a motion vector is given by the following process:
The scaled factor is determined by the following formula:

iScale=(iDiffPocB*iX+32)>>6;

with iX iX=(0x4000 abs(iDiffPocD/2))/iDiffPocD;

The MVt is then given by:

MVt=(iScale*MVcol+127+(iScale*MVcol<0))>>8

In these formulas:
">>" represents the shifting operator
"abs" represents a function which returns the absolute value
"0x4000" represents the value 16384

Embodiments of the invention thus provide a parallel derivation process which the aim of reducing the number of cycles needed to derive a set of motion vector predictors with a minor impact on the coding efficiency.

Although the present invention has been described hereinabove with reference to specific embodiments, the present invention is not limited to the specific embodiments, and modifications will be apparent to a skilled person in the art which lie within the scope of the present invention. Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. method of deriving motion information predictor candidates for at least one motion information predictor for encoding an image portion of an image by motion prediction with respect to at least one reference image portion, a motion information predictor candidate being capable of including a motion vector associated with a first index and a motion vector associated with a second index, the method comprises for at least one image portion to be encoded:
providing for processing, one or more temporal motion information predictor candidates, and one or more spatial motion information predictor candidates;
performing first processing on the one or more temporal motion information predictor candidates but not on the one or more spatial motion information predictor candidates;
performing second processing on the one or more spatial motion information predictor candidates but not on any temporal motion information predictor candidates for said image portion;
obtaining, based on motion information predictor candidates resulting from the first processing and the second processing, a set of motion information predictor candidates for the at least one motion information predictor; and
generating one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and
including the generated one or more additional motion information predictor candidates in the set of motion information predictor candidates,
wherein the second processing comprises excluding a duplicate spatial motion information predictor candidate from the one or more spatial motion information predictor candidates, in the case where the one or more spatial motion information predictor candidates includes a duplicate spatial motion information predictor candidate, and
wherein the first processing comprises scaling the one or more temporal motion information predictor candidate based on a distance between the image of the image portion to be encoded and the image of the reference image portion.

2. A method according to claim 1 wherein at least part of the second processing is performed concurrently with at least part of the first process.

3. A method according to claim 1 wherein the second processing further comprises generating one or more additional motion information predictor candidates based on the one or more spatial motion information predictor candidates.

4. A method according to claim 3, wherein the second processing comprises:
generating one or more additional motion information predictor candidates based on the reduced subset of spatial motion information predictor candidates.

5. A method according to claim 3 wherein scaling of the temporal motion information predictor candidate is performed concurrently with the steps of excluding the duplicate spatial motion information predictor candidate and generating further motion information predictor candidates.

6. A method according to claim 1 further comprising:
excluding a duplicate from among the motion information predictors resulting from the first processing and the second processing, in the case where one or more motion information predictor candidates resulting from the first processing and the second processing are the same, to provide the set of motion information predictor candidates for encoding motion information indicating the reference image such that there are no duplicates among the set of motion information predictor candidates for the at least one motion information predictor.

7. A method according to claim 1 wherein the first processing performed concurrently with the second processing is based on an estimation of the duration of the first processing.

8. A method according to claim 1 wherein the motion information predictor candidates resulting from the second processing which are added to the motion information predictors resulting from the first processing to obtain the set of motion information predictor candidates for the at least one motion information predictor is based on the duration of the first processing.

9. A method according to claim 1, further comprising determining the complexity of the scaling, and
wherein, in a first case where it is determined that the scaling will last for a longer duration than a predetermined duration threshold, the set of motion information predictor candidates for the at least one motion information predictor is obtained by removing duplicates from among the motion information predictor candidates resulting from the first processing and the second processing;
otherwise, in a second case where it is determined that the scaling will last for a shorter duration than the predetermined duration threshold, the set of motion information predictor candidates for the at least one motion information predictor is obtained by adding, to the reduced subset of spatial motion information predictor candidates, a motion information predictor candidate resulting from the first processing which is not a duplicate of any of the motion information predictor candidates of the reduced subset of spatial motion information predictors; wherein the set of motion information predictor candidates for the at least one motion information predictor comprises non duplicate motion information predictor candidates from among the motion information predictor candidates of the reduced subset of spatial motion information predictor candidates and a further second subset of motion information predictor candidates.

10. A device for deriving motion information predictor candidates for at least one motion information predictor for encoding an image portion of an image by motion prediction with respect to at least one reference image portion, a motion information predictor candidate being capable of including a motion vector associated with a first index and a motion vector associated with a second index, the device comprising:
an obtaining unit configured to obtain, one or more temporal motion information predictor candidates and one or more spatial motion information predictor candidates;
a first processing unit configured to perform first processing on the one or more temporal motion information predictor candidates but not on the one or more spatial motion information predictor candidates;
a second processing unit configured to perform second processing on the one or more spatial motion information predictor candidates but not on any temporal motion information predictor candidates for said image portion;
a set obtaining unit configured to obtain, based on the first processing and the second processing a set of motion information predictor candidates for at least one motion information predictor; and
a generating unit to generate one or more additional motion information predictor candidates by combining motion information vectors from first and second motion information predictor candidates included in the set of motion information predictor candidates, the motion vector from the first motion information predictor candidate being associated with the first index and the motion vector from the second motion information predictor candidate being associated with the second index;
an including unit configured to include the generated one or more additional motion information predictor candidates in the set of motion information predictor candidates,
wherein the second processing unit is operable to exclude a duplicate spatial motion information predictor candidate from the one or more spatial motion information predictor candidates, in the case where the one or more spatial motion information predictor candidates includes a duplicate spatial motion information predictor candidate, and
wherein the first processing unit is operable to scale the one or more temporal motion information predictor candidate based on a distance between the image of the image portion to be encoded and the image of the reference image portion.

11. A device according to claim 10 wherein the second processing unit is operable to perform at least part of the second process concurrently with at least part of the first process performed by the first processing unit.

12. A device according to claim 10 wherein the second processing unit is operable to generate one or more additional motion information predictor candidates based on the one or more spatial motion information predictor candidates.

13. A device according to claim 12, wherein the second processing unit is operable to:
generate one or more additional motion information predictor candidates based on the reduced subset of spatial motion information predictor candidates.

14. A device according to claim 13 wherein the first processing unit is operable to perform scaling of the temporal motion information predictor candidate concurrently with the operations of excluding the duplicate spatial motion information predictor candidate and generating further motion information predictor candidates.

15. A device according to claim 10, further comprising:
a suppression unit configured to exclude a duplicate from among the motion information predictors resulting from the first processing and the second processing, in a case where one or more motion information predictor candidates resulting from the first processing and the second processing are the same, to provide the set of motion information predictor candidates for encoding motion information indicating the reference image portion and encoding said image portion such that there are no duplicates among the set of motion information predictor candidates for the at least one motion information predictor.

16. A device according to claim 10 further comprising an estimating unit configured to estimate the duration of the first processing wherein the second processing performed by the second processing unit concurrently with the first processing performed by the first processing unit is based on the estimation of the duration of the first processing.

17. A device according to claim 10 further comprising an estimating unit configured to estimate the duration of the first processing wherein the motion information predictor candidates resulting from the second processing which are added to the motion information predictor candidates resulting from the first processing to obtain the set of motion information predictor candidates for the at least one motion information predictor is based on the duration of the first process.

18. A device according to claim 10, further comprising a determining unit configured to determine the complexity of the scaling and a suppression unit operable to obtain the set of motion information predictor candidates for the at least one motion information predictor which are non-duplicate;
wherein, in a first case where it is determined that the scaling will last for a longer duration than a predetermined duration threshold, the suppression unit is operable to exclude the duplicate spatial motion information predictor from among the motion information predictor candidates resulting from the first processing and the second processing;
otherwise, in the second case where it is determined that the scaling will last for a shorter duration than the predetermined duration threshold, the suppression unit is operable to add to the reduced subset of spatial motion information predictor candidates, a motion information predictor candidate resulting from processing of the spatial motion information predictor candidates which is not a duplicate of any of the motion information predictor candidates of the reduced subset of motion information predictors; wherein the set of motion information predictor candidates for the at least one motion information predictor comprises non duplicate motion information predictor candidates from among the motion information predictor candidates of the reduced subset of spatial motion information predictor candidates and a further second subset of motion information predictor candidates.

19. A method of encoding a sequence of digital images into a bitstream, at least one portion of an image being encoded by motion prediction with respect to a reference image portion, the method comprises:
obtaining motion information predictors usable for motion prediction of the image portion with respect to the at least one reference image portion wherein said obtaining includes deriving motion information predictor candidates for at least one motion information predictor for encoding an image portion of an image by motion prediction with respect to at least one reference image portion, a motion information predictor candidate being capable of including a motion vector associated with a first index and a motion vector associated with a second index, said deriving comprises for at least one image portion to be encoded:
providing for processing, one or more temporal motion information predictor candidates, and one or more spatial motion information predictor candidates;
performing first processing on the one or more temporal motion information predictor candidates but not on the one or more spatial motion information predictor candidates;
performing second processing on the one or more spatial motion information predictor candidates but not on any temporal motion information predictor candidates for said image portion;
obtaining, based on motion information predictor candidates resulting from the first processing and the second processing, a set of motion information predictor candidates for the at least one motion information predictor; and generating one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and
including the generated one or more additional motion information predictor candidates in the set of motion information predictor candidates,
wherein the second processing comprises excluding a duplicate spatial motion information predictor candidate from the one or more spatial motion information predictor candidates, in the case where the one or more spatial motion information predictor candidates includes a duplicate spatial motion information predictor candidate; and
wherein the first processing comprises scaling the one or more temporal motion information predictor candidate based on a distance between the image of the image portion to be encoded and the image of the reference image portion;
selecting at least one motion information predictor from the set of motion information predictor candidates for predicting said image portion from the reference image portion for encoding the image portion; and
encoding the image portion using the selected at least one motion information predictor.

20. A method according to claim 19 further comprising encoding an information item identifying the selected motion information predictor.

21. An encoding device for encoding a sequence of images into a bitstream, at least one portion of an image being encoded by motion prediction with respect to a reference image portion, the encoding device comprising:
a device for deriving motion information predictor candidates for at least one motion information predictor for encoding of an image portion of an image by motion prediction with respect to at least one reference image portion, a motion information predictor candidate being capable of including a motion vector associated with a first index corresponding to a first reference picture list and a motion vector associated with a second index corresponding to a second reference picture list, the device comprising:
an obtaining unit configured to obtain, one or more temporal motion information predictor candidates and one or more spatial motion information predictor candidates;
a first processing unit configured to perform first processing on the one or more temporal motion information predictor candidates but not on the one or more spatial motion information predictor candidates; and
a second processing unit configured to perform second processing on the one or more spatial motion information predictor candidates but not on any temporal motion information predictor candidates for said image portion;
a set obtaining unit configured to obtain, based on motion information predictor candidates resulting from the first processing and the second processing, a set of motion information predictor candidates for the at least one motion information predictor; and
a generating unit configured to generate one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and an including unit configured to include the generated one or more additional motion information predictor candidates in the set of motion information predictor candidates, wherein the second processing unit is operable to exclude a duplicate spatial motion information predictor candidate from the one or more spatial motion information predictor candidates, in the case where the one or more spatial motion information predictor candidates includes a duplicate spatial motion information predictor candidate;

wherein the first processing unit is operable to scale the one or more temporal motion information predictor candidate based on a distance between the image of the image portion to be encoded and the image of the reference image portion;

a selection unit configured to select at least one motion information predictor from the set of motion information predictor candidates or predicting said image portion from the reference image portion for encoding the image portion; and an encoding unit configured to encode the image portion using the selected at least one motion information predictor.

22. A method of decoding a bitstream comprising an encoded sequence of images, at least one portion of an image having been encoded by motion prediction with respect to a reference image portion, the method comprising for at least one image portion to be decoded:

obtaining motion information predictors usable for motion prediction of the image portion with respect to the at least one reference image portion wherein said obtaining includes deriving motion information predictor candidates for at least one motion information predictor for decoding an image portion of an image by motion prediction with respect to at least one reference image portion, a motion information predictor candidate being capable of including a motion vector associated with a first index corresponding to a first reference picture list and a motion vector associated with a second index corresponding to a second reference picture list said deriving comprises for at least one image portion to be decoded:

providing for processing, one or more temporal motion information predictor candidates, and one or more spatial motion information predictor candidates;

performing first processing on the one or more temporal motion information predictor candidates but not on the one or more spatial motion information predictor candidates;

performing second processing on the one or more spatial motion information predictor candidates but not on any temporal motion information predictor candidates for said image portion;

obtaining, based on motion information predictor candidates resulting from the first processing and the second processing, a set of motion information predictor candidates for the at least one motion information predictor; and generating one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and including the generated one or more additional motion information predictor candidates in the set of motion information predictor candidates, wherein the second processing comprises excluding a duplicate spatial motion information predictor candidate from the one or more spatial motion information predictor candidates, in the case where the one or more spatial motion information predictor candidates includes a duplicate spatial motion information predictor candidate;

wherein the first processing comprises scaling the one or more temporal motion information predictor candidate based on a distance between the image of the image portion to be decoded and the image of the reference image portion;

selecting at least one motion information predictor from the set of motion information predictor candidates for predicting said image portion from the reference image portion for decoding the image portion; and decoding the image portion using the selected at least one motion information predictor.

23. A decoding device for decoding a bitstream comprising an encoded sequence of images, at least one portion of an image having been encoded by motion prediction with respect to a reference image portion, a motion information predictor candidate being capable of including a motion vector associated with a first index corresponding to a first reference picture list and a motion vector associated with a second index corresponding to a second reference picture list, the decoding device comprising:

a device for deriving motion information predictor candidates for at least one motion information predictor for decoding an image portion of an image by motion prediction with respect to at least one reference image portion, the device comprising:

an obtaining unit configured to obtain, one or more temporal motion information predictor candidates and one or more spatial motion information predictor candidates;

a first processing unit configured to perform first processing on the one or more temporal motion information predictor candidates but not on the one or more spatial motion information predictor candidates; and a second processing unit configured to perform second processing on the one or more spatial motion information predictor candidates but not on any temporal motion information predictor candidates for said image portion;

a set obtaining unit configured to obtain, based on motion information predictor candidates resulting from the first processing and the second processing, a set of motion information predictor candidates for the at least one motion information predictor; and a generating unit configured to generate one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and an including unit configured to include the generated one or more additional motion information predictor candidates in the set of motion information predictor candidates, wherein the second processing unit is operable to exclude a duplicate spatial motion information predictor candidate from the one or more spatial motion information predictor candidates, in the case where the one or more spatial motion information predictor candidates includes a duplicate spatial motion information predictor;

wherein the first processing unit is operable to scale the one or more temporal motion information predictor candidate based on a distance between the image of the image portion to be decoded and the image of the reference image portion;

a selection unit configured to select at least one motion information predictor from the set of motion information predictor candidates for predicting said image portion from the reference image portion for decoding the image portion; and a decoding unit configured to decode the image portion using the selected at least one motion information predictor.

24. A non-transitory computer readable carrier medium comprising processor executable code fora method of deriving motion information predictor candidates for at least one motion information predictor for encoding an image portion of an image by motion prediction with respect to at least one reference image portion, a motion information predictor candidate being capable of including a motion vector associated with a first index corresponding to a first reference picture list and a motion vector associated with a second index corresponding to a second reference picture list, wherein execution of the processor executable code by one or more processors causes the one or more processors to, for an image portion to be encoded:

provide for processing, one or more temporal motion information predictor candidates, and one or more spatial motion information predictor candidates;

perform first processing on the one or more temporal motion information predictor candidates but not on the one or more spatial motion information predictor candidates;

perform second processing on the one or more spatial motion information predictor candidates but not on any temporal motion information predictor candidates for said image portion;

obtain, based on motion information predictor candidates resulting from the first processing and the second processing, a set of motion information predictor candidates for the at least one motion information predictor; and generating one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and including the generated one or more additional motion information predictor candidates in the set of motion information predictor candidates, wherein the second processing comprises excluding a duplicate spatial motion information predictor candidate from the one or more spatial motion information predictor candidates, in the case where the one or more spatial motion information predictor candidates includes a duplicate spatial motion information predictor candidate, and wherein the first processing comprises scaling the one or more temporal motion information predictor candidate based on a distance between the image of the image portion to be encoded and the image of the reference image portion.

25. A method of deriving motion information predictor candidates for at least one motion information predictor for decoding of an image portion of an image by motion prediction with respect to at least one reference image portion, a motion information predictor candidate being capable of including a motion vector associated with a first index corresponding to a first reference picture list and a motion vector associated with a second index corresponding to a second reference picture list, the method comprises for at least one image portion to be decoded:

providing for processing, one or more temporal motion information predictor candidates, and one or more spatial motion information predictor candidates;

performing first processing on the one or more temporal motion information predictor candidates but not on the one or more spatial motion information predictor candidates;

performing second processing on the one or more spatial motion information predictor candidates but not on any temporal motion information predictor candidates for said image portion;

obtaining, based on motion information predictor candidates resulting from the first processing and the second processing, a set of motion information predictor candidates for the at least one motion information; and generating one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and including the generated one or more additional motion information predictor candidates in the set of motion information predictor candidates, wherein the second processing comprises excluding a duplicate spatial motion information predictor candidate from the one or more spatial motion information predictor candidates, in the case where the one or more spatial motion information predictor candidates includes a duplicate spatial motion information predictor candidate, and wherein the first processing comprises scaling the one or more temporal motion information predictor candidate based on a distance between the image of the image portion to be decoded and the image of the reference image portion.

26. A method according to claim 25 wherein at least part of the second processing is performed concurrently with at least part of the first process.

27. A method according to claim 25 wherein the second processing further comprises generating one or more additional motion information predictor candidates based on the one or more spatial motion information predictor candidates.

28. A method according to claim 27, wherein the second process comprises:
  generating one or more additional motion information predictor candidates based on the reduced subset of spatial motion information predictor candidates.

29. A method according to claim 27 wherein scaling of the temporal motion information predictor candidate is performed concurrently with the steps of excluding the duplicate spatial motion information predictor candidate and generating further motion information predictor candidates.

30. A method according to claim 25 further comprising:
  excluding a duplicate from among the motion information predictors resulting from the first processing and the second processing, in the case where one or more motion information predictor candidates resulting from the first processing and the second processing are the same, to provide the set of motion information predictor candidates for decoding motion information indicating the reference image such that there are no duplicates among the set of motion information predictor candidates for the at least one motion information predictor.

31. A method according to claim 25 wherein the first processing performed concurrently with the second processing is based on an estimation of the duration of the first processing.

32. A method according to claim 25 wherein the motion information predictor candidates resulting from the second processing which are added to the motion information predictors resulting from the first processing to obtain the set of motion information predictor candidates for the at least one motion information predictor is based on the duration of the first processing.

33. A method according to claim 25, further comprising determining the complexity of the scaling, and
  wherein, in a first case where it is determined that the scaling will last for a longer duration than a predetermined duration threshold, the set of motion information predictor candidates for the at least one motion information predictor is obtained by removing duplicates from among the motion information predictor candidates resulting from the first processing and the second processing;
  otherwise, in a second case where it is determined that the scaling will last for a shorter duration than the predetermined duration threshold, the set of motion information predictor candidates for the at least one motion information predictor is obtained by adding, to the reduced subset of spatial motion information predictor candidates, a motion information predictor candidate resulting from the first processing which is not a duplicate of any of the motion information predictor candidates of the reduced subset of spatial motion information predictors; wherein the set of motion information predictor candidates for the at least one motion information predictor comprises non duplicate motion information predictor candidates from among the motion information predictor candidates of the reduced subset of spatial motion information predictor candidates and a further second subset of motion information predictor candidates.

34. A device for deriving motion information predictor candidates for at least one motion information predictor for decoding an image portion of an image by motion prediction with respect to at least one reference image portion, a motion information predictor candidate being capable of including a motion vector associated with a first index corresponding to a first reference picture list and a motion vector associated with a second index corresponding to a second reference picture list, the device comprising:
  an obtaining unit configured to obtain, one or more temporal motion information predictor candidates and one or more spatial motion information predictor candidates;
  a first processing unit configured to perform first processing on the one or more temporal motion information predictor candidates but not on the one or more spatial motion information predictor candidates;
  a second processing unit configured to perform second processing on the one or more spatial motion information predictor candidates but not on any temporal motion information predictor candidates for said image portion;
  a set obtaining unit configured to obtain, based on the first processing and the second processing, a set of motion information predictor candidates for at least one motion information predictor; and
  a generating unit configured to generate one or more additional motion information predictor candidates by combining motion information vectors from first and second motion information predictor candidates included in the set of motion information predictor candidates, the motion vector from the first motion information predictor candidate being associated with the first index and the motion vector from the second motion information predictor candidate being associated with the second index;
  an including unit configured to include the generated one or more additional motion information predictor candidates in the set of motion information predictor candidates,
  wherein the second processing unit is operable to exclude a duplicate spatial motion information predictor candidate from the one or more spatial motion information predictor candidates, in the case where the one or more spatial motion information predictor candidates includes a duplicate spatial motion information predictor, and
  wherein the first processing unit is operable to scale the one or more temporal motion information predictor candidate based on a distance between the image of the image portion to be decoded and the image of the reference image portion.

35. A device according to claim 34 wherein the second processing unit is operable to perform at least part of the second process concurrently with at least part of the first process performed by the first processing unit.

36. A device according to claim 34 wherein the second processing unit is operable to generate one or more additional motion information predictor candidates based on the one or more spatial motion information predictor candidates.

37. A device according to claim 36, wherein the second processing unit is operable to:
  generate one or more additional motion information predictor candidates based on the reduced subset of spatial motion information predictor candidates.

38. A device according to claim 37 wherein the first processing unit is operable to perform scaling of the temporal motion information predictor candidate concurrently with the operations of excluding the duplicate spatial motion information predictor candidate and generating further motion information predictor candidates.

39. A device according to claim 34, further comprising:
a suppression unit configured to exclude a duplicate from among the motion information predictors resulting from the first processing and the second processing, in a case where one or more motion information predictor candidates resulting from the first processing and the second processing are the same, to provide the set of motion information predictor candidates for decoding motion information indicating the reference image portion and decoding said image portion such that there are no duplicates among the set of motion information predictor candidates for the at least one motion information predictor.

40. A device according to claim 34 further comprising an estimating unit configured to estimate the duration of the first processing wherein the second processing performed by the second processing unit concurrently with the first processing performed by the first processing unit is based on the estimation of the duration of the first processing.

41. A device according to claim 34 further comprising an estimating unit configured to estimate the duration of the first processing wherein the motion information predictor candidates resulting from the second processing which are added to the motion information predictor candidates resulting from the first processing to obtain the set of motion information predictor candidates the at least one motion information predictor is based on the duration of the first process.

42. A device according to claim 34, further comprising a determining unit configured to determine the complexity of the scaling and a suppression unit operable to obtain the set of motion information predictor candidates usable for the at least one motion information predictor which are non-duplicate;
wherein, in a first case where it is determined that the scaling will last for a longer duration than a predetermined duration threshold, the suppression unit is operable to exclude the duplicate spatial motion information predictor from among the motion information predictor candidates resulting from the first processing and the second processing;
otherwise, in the second case where it is determined that the scaling will last for a shorter duration than the predetermined duration threshold, the suppression unit is operable to add to the reduced subset of spatial motion information predictor candidates, a motion information predictor resulting from processing of the spatial motion information predictor candidates which is not a duplicate of any of the motion information predictors of the reduced subset of motion information predictors; wherein the set of motion information predictor candidates usable the at least one motion information predictor comprises non duplicate motion information predictor candidates from among the motion information predictor candidates of the reduced subset of spatial motion information predictor candidates and a further second subset of motion information predictor candidates.

43. A non-transitory computer readable carrier medium comprising processor executable code for a method of deriving motion information predictor candidates for at least one motion information predictor for decoding of an image portion of an image by motion prediction with respect to at least one reference image portion, a motion information predictor candidate being capable of including a motion vector associated with a first index corresponding to a first reference picture list and a motion vector associated with a second index corresponding to a second reference picture list, wherein execution of the processor executable code by one or more processors causes the one or more processors to, for an image portion to be decoded:
provide for processing, one or more temporal motion information predictor candidates, and one or more spatial motion information predictor candidates;
perform first processing on the one or more temporal motion information predictor candidates but not on the one or more spatial motion information predictor candidates;
perform second processing on the one or more spatial motion information predictor candidates but not on any temporal motion information predictor candidates for said image portion;
obtain, based on motion information predictor candidates resulting from the first processing and the second processing, a set of motion information predictor candidates for the at least motion information predictor; and
generating one or more additional motion information predictor candidates by combining motion vectors from first and second motion information predictor candidates included in the set of motion information predictor candidates, the motion vector from the first motion information predictor candidate being associated with the first index and the motion vector from the second motion information predictor candidate being associated with the second index; and
including the generated one or more additional motion information predictor candidates in the set of motion information predictor candidates,
wherein the second processing comprises excluding a duplicate spatial motion information predictor candidate from the one or more spatial motion information predictor candidates, in the case where the one or more spatial motion information predictor candidates includes a duplicate spatial motion information predictor candidate, and
wherein the first processing comprises scaling the one or more temporal motion information predictor candidate based on a distance between the image of the image portion to be decoded and the image of the reference image portion.

* * * * *